United States Patent
Shutayfi

(10) Patent No.: US 12,412,675 B2
(45) Date of Patent: Sep. 9, 2025

(54) SHIELDED ELECTROMAGNETIC PUMPS FOR NUCLEAR REACTORS

(71) Applicant: GE-Hitachi Nuclear Energy Americas LLC, Wilmington, NC (US)

(72) Inventor: Mohammed Shutayfi, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 38 days.

(21) Appl. No.: 17/881,916

(22) Filed: Aug. 5, 2022

(65) Prior Publication Data

US 2024/0047089 A1    Feb. 8, 2024

(51) Int. Cl.
G21C 15/247 (2006.01)
G21C 11/02 (2006.01)
H02K 5/20 (2006.01)
H02K 44/06 (2006.01)

(52) U.S. Cl.
CPC .......... G21C 15/247 (2013.01); G21C 11/026 (2013.01); H02K 5/20 (2013.01); H02K 44/06 (2013.01)

(58) Field of Classification Search
CPC ........ H02K 44/02; H02K 44/06; G21C 15/24; G21C 15/243; G21C 15/247
USPC .......................................................... 417/50
See application file for complete search history.

(56) References Cited

U.S. PATENT DOCUMENTS 3,075,925 A * 1/1963 Dunegan ................. G21F 1/106
376/288
4,174,190 A 11/1979 Craig et al.
4,828,459 A 5/1989 Behrens
5,195,231 A 3/1993 Fanning et al.
2009/0279656 A1* 11/2009 Defilippis ................. F16F 9/19
376/260

(Continued)

FOREIGN PATENT DOCUMENTS

JP S5289796 A 7/1977
JP S62113093 * 5/1987 ............. Y02E 30/30

OTHER PUBLICATIONS

Hayashi translation (Year: 1987).*

(Continued)

Primary Examiner — Philip E Stimpert
(74) Attorney, Agent, or Firm — Harness, Dickey & Pierce, P.L.C.

(57) ABSTRACT

An electromagnetic pump (EMP) for a liquid metal-cooled nuclear reactor includes a pump casing, concentric inner and outer flow ducts collectively defining a flow annulus extending coaxially with a longitudinal axis of the EMP, and induction coils configured to control the flow of liquid metal coolant through the flow annulus based on electrical power received from the power supply. At least one of the inner flow duct or the outer flow duct includes a gamma shielding material configured to block gamma rays from entering an interior of the EMP from the flow annulus. The pump casing may include a neutron absorber material configured to absorb neutrons entering the pump casing from an exterior of the EMP. The EMP may include a neutron moderator material on an outer surface of the pump casing and configured to moderate neutrons entering the pump casing to be absorbed by the neutron absorber material.

20 Claims, 10 Drawing Sheets

(56) References Cited

U.S. PATENT DOCUMENTS

| | | | | |
|---|---|---|---|---|
| 2013/0207401 | A1* | 8/2013 | Makhlouf | F02C 1/10 290/1 R |
| 2016/0125963 | A1 | 5/2016 | McDaniel | |
| 2017/0162283 | A1* | 6/2017 | Loewen | H02K 44/06 |
| 2017/0186502 | A1* | 6/2017 | Kingham | G21B 1/13 |

OTHER PUBLICATIONS

Gamma Ray Attenuation Properties—MarShield (Year: 2022).*
"Neutron Shielding Materials"—McAlister (Year: 2016).*
Nashine, B.K., et al., "Design, development and testing of a sodium submersible Annular Linear Induction Pump for application in sodium cooled fast reactor", Annals of Nuclear Energy, vol. 145, (2020), 107494, p. 1-12. <https://doi.org/10.1016/j.anucene.2020.107494>.
Ota, Hiroyuki, et al., "Development of 160 m3/min Large Capacity Sodium-Immersed Self-Cooled Electromagnetic Pump", Journal of Nuclear Science and Technology, vol. 41, No. 4, p. 511-523 (2004). DOI: 10.1080/18811248.2004.9715514.
Aizawa, Kosuke, et al., "Electromagnetic Pumps for Main Cooling Systems of Commercialized Sodium-Cooled Fast Reactor", Journal of Nuclear Science and Technology, vol. 48, No. 3, p. 344-352 (2011). DOI: 10.1080/18811248.2011.9711709.
Buhler, Leo, "Liquid Metal Magnetohydrodynamics for Fusion Blankets." In: "Magnetohydrodynamics, Historical Evolution and Trends" by Sergei S. Molokov et al. (eds.), Springer, p. 171-194 (2007).
Waltar, Alan, et al. (eds.), "Fast Spectrum Reactors," Springer, p. 354-361 (2011).
Waltar, Alan, et al. (eds.), "Fast Spectrum Reactors," Springer, p. 138, footnote 2 (2011).
Mikhaelia, L.Y, et al., "Comparison of Boron Carbide, Gadolinium Oxide, and Hafnium as Qualified Molten Salt Reactor's Control Rods Material," Journal of Physics: Conference Series, 1825 (2004), p. 1-6.
McAlister, Daniel, "Gamma Ray Attenuation Properties of Common Shielding Materials," PG Research Foundation, Inc., (2018), p. 1-25.
McAlister, Daniel, "Neutron Shielding Materials," PG Research Foundation, Inc., (2016), p. 1-14.
International Search Report and Written Opinion thereof mailed Jul. 22, 2024 for corresponding International Application No. PCT/US2023/071499.
International Preliminary Report on Patentability dated Feb. 4, 2025 for corresponding International Application No. PCT/US2023/071499.

* cited by examiner

SHIELDED ELECTROMAGNETIC PUMPS FOR NUCLEAR REACTORS

BACKGROUND

Field

The present inventive concepts relate in general to nuclear reactors and in particular to electromagnetic pumps used to control liquid metal coolant circulation through a reactor core of a liquid metal-cooled nuclear reactor and further in particular to providing improved protection of electromagnetic pumps against radiation and/or thermal aspects of operating environments of nuclear reactors.

Description of Related Art

Nuclear reactors included in nuclear plants may be configured to be cooled via heat transfer to one or more coolants circulated through the core. Various coolants may be utilized to remove heat from the reactor core. A coolant may include one or more various substances, including water, liquid metal, molten salt, a gaseous substance, some combination thereof, etc.

In some nuclear plants, a coolant removing heat from a reactor core, also referred to herein as a primary coolant, is circulated through a heat exchanger to transfer the heat to another coolant, also referred to herein as a secondary coolant. In some cases, the secondary coolant is used to perform work, including driving an electrical generator via circulating through a turbine device included in the nuclear plant. In some nuclear plants, a coolant may be used to provide process heat to support one or more industrial processes, including desalination, hydrogen production, etc.

In some cases, a nuclear reactor is configured to be cooled by liquid metal circulation. Such a nuclear reactor is referred to herein interchangeably as a liquid metal-cooled nuclear reactor and may include a primary coolant loop via which one or more liquid metal substances are circulated as the primary coolant. Such one or more liquid metal substances circulating through the primary coolant loop may be circulated at least partially through a reactor core of the nuclear reactor and are referred to herein as liquid metal coolants.

In some cases, a liquid metal coolant that may be circulated through a nuclear reactor includes a conductive liquid metal substance. A liquid metal-cooled nuclear reactor configured to be cooled via a conductive liquid metal substance may include one or more electromagnetic pumps (EMPs, also referred to herein interchangeably as EM pumps) configured to circulate the conductive liquid metal coolant through the nuclear reactor.

SUMMARY

According to some example embodiments, a nuclear reactor configured to be cooled via liquid metal circulation may include a reactor pressure vessel, a reactor core within the reactor pressure vessel, and an electromagnetic pump (EMP) within the reactor pressure vessel. The EMP may be configured to circulate a flow of liquid metal coolant through a primary coolant flow path that includes the reactor core. The EMP may include a pump casing having a longitudinal axis extending in a longitudinal direction, the pump casing at least partially defining an interior of the EMP, concentric inner and outer flow ducts extending coaxially with the longitudinal axis and collectively defining a flow annulus extending coaxially with the longitudinal axis, and a plurality of induction coils within the interior of the EMP and configured to be electrically connected to a power supply, the plurality of induction coils configured to control the flow of liquid metal coolant through the primary coolant flow path via the flow annulus based on electrical power received from the power supply. At least one flow duct of the inner flow duct or the outer flow duct may include a gamma shielding material that is configured to block gamma rays from entering the interior of the EMP from the flow annulus.

The at least one flow duct may include concentric cylindrical duct walls defining a duct annulus between the concentric cylindrical duct walls. The gamma shielding material may be located within the duct annulus.

The at least one flow duct may include a material at least partially defining an inner surface or an outer diameter surface of the flow annulus, the material including the gamma shielding material.

Each of the inner flow duct and the outer flow duct may include the gamma shielding material.

The pump casing may include a neutron absorber material that is configured to absorb neutrons entering the pump casing from an exterior of the EMP.

The pump casing may include concentric cylindrical casing walls defining a casing annulus between the concentric cylindrical casing walls. The neutron absorber material may be located within the casing annulus.

The EMP may further include a neutron moderator material on an outer surface of the pump casing. The neutron moderator material may be configured to moderate neutrons received from the exterior of the EMP such that the neutrons entering the pump casing from the exterior of the EMP are moderated neutrons, and the neutron absorber material may be configured to absorb the moderated neutrons.

The nuclear reactor may further include a control system configured to control the power supply to control a supply of the electrical power to the EMP, to control the flow of liquid metal coolant through the primary coolant flow path.

The plurality of induction coils may include at least one of inner induction coils located within a central region at least partially defined by an inner surface of the inner flow duct, or outer induction coils located within an annular region at least partially defined between an outer surface of the outer flow duct and an inner surface of the pump casing.

According to some example embodiments, an electromagnetic pump (EMP) may include a pump casing having a longitudinal axis extending in a longitudinal direction, the pump casing at least partially defining an interior of the EMP, concentric inner and outer flow ducts extending coaxially with the longitudinal axis and collectively defining a flow annulus extending coaxially with the longitudinal axis; and a plurality of induction coils within the interior of the EMP and configured to be electrically connected to a power supply, the plurality of induction coils configured to control a flow of liquid metal coolant through the flow annulus based on electrical power received from the power supply. At least one flow duct of the inner flow duct or the outer flow duct may include a gamma shielding material that is configured to block gamma rays from entering the interior of the EMP from the flow annulus.

The at least one flow duct may include concentric cylindrical duct walls defining a duct annulus between the concentric cylindrical duct walls. The gamma shielding material may be located within the duct annulus.

The at least one flow duct may include a material at least partially defining an inner surface or an outer diameter surface of the flow annulus. The material may include the gamma shielding material.

Each of the inner flow duct and the outer flow duct may include the gamma shielding material.

The pump casing may include a neutron absorber material that is configured to absorb neutrons entering the pump casing from an exterior of the EMP.

The pump casing may include concentric cylindrical housing walls defining a housing annulus between the concentric cylindrical housing walls. The neutron absorber material may be located within the housing annulus.

The EMP may further include a neutron moderator material on an outer surface of the pump casing. The neutron moderator material may be configured to moderate neutrons received from the exterior of the EMP such that the neutrons entering the pump casing from the exterior of the EMP are moderated neutrons, and the neutron absorber material may be configured to absorb the moderated neutrons.

The plurality of induction coils may include at least one of inner induction coils located within a central region at least partially defined by an inner surface of the inner flow duct, or outer induction coils located within an annular region at least partially defined between an outer surface of the outer flow duct and an inner surface of the pump casing.

According to some example embodiments, a method for operating the EMP may include controlling a supply of electrical power to the EMP to cause the plurality of induction coils to generate one or more magnetic fields to induce the flow of liquid metal coolant through the flow annulus, and blocking, at the gamma shielding material included in the at least one flow duct, gamma rays emitted from liquid metal coolant located in the flow annulus from entering an interior of the EMP that is external to the flow annulus.

The pump casing may include a neutron absorber material that is configured to absorb neutrons entering the pump casing from an exterior of the EMP, and the method may further include absorbing, at the neutron absorber material, neutrons received at the pump casing from the exterior of the EMP.

According to some example embodiments, a method for configuring a nuclear reactor to improve liquid metal coolant flow control in the nuclear reactor may include installing an electromagnetic pump (EMP) in a primary coolant loop in a nuclear reactor pressure of the nuclear reactor. The EMP may include a pump casing having a longitudinal axis extending in a longitudinal direction, the pump casing at least partially defining an interior of the EMP, concentric inner and outer flow ducts extending coaxially with the longitudinal axis and collectively defining a flow annulus extending coaxially with the longitudinal axis, and a plurality of induction coils within the interior of the EMP and configured to be electrically connected to a power supply, the plurality of induction coils configured to control a flow of liquid metal coolant through the flow annulus based on electrical power received from the power supply, wherein at least one flow duct of the inner flow duct or the outer flow duct includes a gamma shielding material that is configured to block gamma rays from entering the interior of the EMP from the flow annulus. The method may include electrically connecting the EMP to the power supply via a power cable, and communicatively coupling the EMP to a control system, the control system including a memory storing a program of instructions and a processor configured to execute the program of instructions to control the flow of liquid metal coolant through the primary coolant loop based on controlling the supply of electrical power supplied from the power supply to the EMP.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
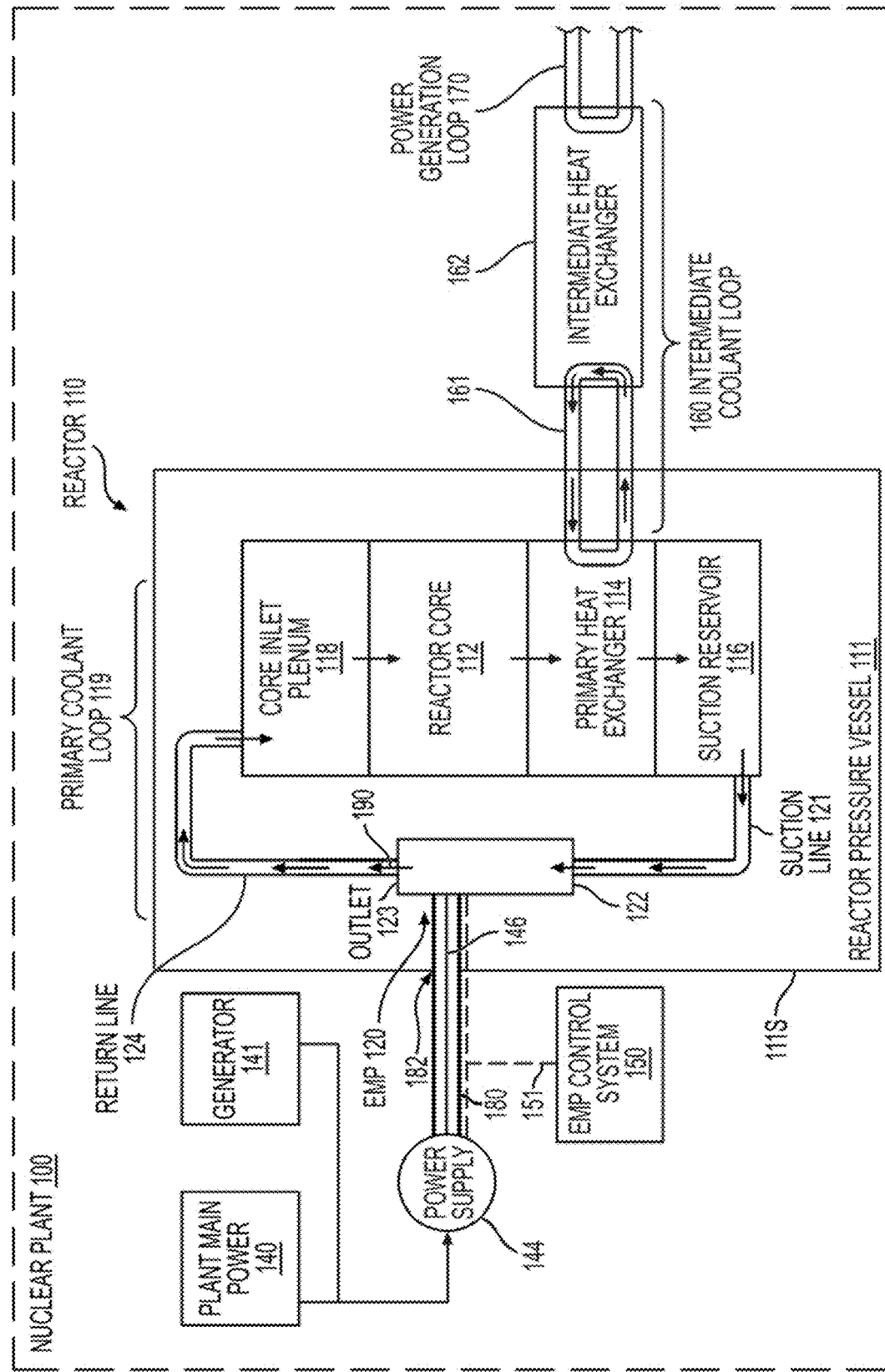
FIG. 1 is a schematic view of a nuclear plant that includes a liquid metal-cooled nuclear reactor and at least one EM pump, according to some example embodiments.

Reference will now be made in detail to example embodiments, some of which are illustrated in the accompanying drawings, wherein like reference labels refer to like elements throughout.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Units, systems, and/or devices according to some example embodiments may be implemented using one or more instances of hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to some example embodiments, computer processing devices may be described as including various functional units that perform various operations and/or functions to increase the clarity of the description. However, computer processing devices are not intended to be limited to these functional units. For example, in some example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to some example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The inventive concepts relate to electromagnetic pumps (EMPs) configured to provide improved control, including improved reliability of such control, of liquid metal coolant flow through at least a portion of a nuclear reactor, liquid metal-cooled nuclear reactors including one or more of the electromagnetic pumps, and methods of configuring and/or operating the electromagnetic pumps and/or nuclear reactors.

The electromagnetic pumps (EMPs) according to some example embodiments of the inventive concepts may include an Annular Linear Induction Pump (ALIP). An Annular Linear Induction Pump (ALIP) may be an electromagnetic pump that is configured to pump liquid metals based on applying electromagnetic forces on a liquid metal coolant to cause the liquid metal coolant to flow through the length (e.g., in parallel with the longitudinal axis) of the pump. This may be performed based on applying AC current at specified AC frequencies and phase angles to induction coils of the ALIP that surround a flow annulus that extends along the length of the pump (e.g., coaxially with the longitudinal axis of the pump).

In some example embodiments, an EMP may be configured to provide self-cooling during operation, for example based on rejecting heat generated in the EMP into the flow of liquid metal coolant flowing through the EMP. In some example embodiments, some or all of the heat generated by the EMP is removed from the stators of the EMP to the liquid metal coolant rather than the traditional approach of an active auxiliary cooling system located external to the reactor as required in prior EM pump designs. For example, the EMP may draw liquid metal coolant from a cold pool (e.g., a suction reservoir as described herein) at an inlet temperature of approximately 350° C. that is strongly activated (Na-24), which might result in the nuclear reactor having a secondary, or intermediate coolant loop that includes liquid metal coolant such as sodium or lead. Self-cooled EMPs may reduce, minimize, or prevent downsides associated with external cooling methods. The internal components of the EMP, such as electrical insulation, induction coils, and stators, are configured to endure the harsh thermal and radiation environment in-vessel for the primary coolant loop.

In some example embodiments, an EMP may be configured to provide at least partial shielding of some or all internal components of the EMP from gamma rays emitted from liquid metal coolant flowing through the EMP, based on including one or more gamma shielding materials. And thereby providing gamma ray shielding to the EMP. In some example embodiments, an EMP may be configured to provide shielding of some or all internal components of the EMP from neutrons received from an exterior of the EMP (e.g., ambient neutrons received from an ambient environment surrounding the EMP), based on including one or more neutron absorber materials and thereby providing neutron exposure shielding to the EMP. Based on including one or more gamma shielding materials in one or more components of the EMP and/or based on including one or more neutron absorber materials in one or more components of the EMP, wear and/or damage which may otherwise be incurred by the EMP due to the gamma rays and/or ambient neutrons entering the EMP and contacting one or more internal components thereof (e.g., induction coils, electrical insulation, circuitry, stators, etc.) may be reduced, minimized, or prevented. As a result, the service lifetime of the EMP may be improved, the reliability of the EMP may be increased, maintenance of the EMP may be reduced, and/or decommissioning of the EMP may be simplified due to reduced irradiation and/or activation of internal components of the EMP.

Additionally, based on being configured to have gamma ray shielding and/or ambient neutron shielding, the EMP may be configured to be positioned in a nuclear reactor in closer proximity to the nuclear reactor core as the EMP may have improved shielding from ambient neutrons of the high radiation, high temperature ambient environment that is in close proximity to the nuclear reactor core and further having shielding from gamma rays emitted by liquid metal coolant circulated (e.g., flowing) through the nuclear reactor, thereby enabling improved compactness of the nuclear reactor design. Additionally, the EMP may, based on including the gamma shielding material and/or neutron absorber material, may configure the EMP to have reduced likelihood of pump failure due to radiation insulation degradation effects, reduce component activation level of components of the EMP, simplify decommissioning procedures, and fully utilize the advantages of large EMPs in liquid metal-cooled nuclear reactors.

As described herein, the internal components of an EMP include the pump ducts (also referred to herein as flow ducts) and pump housing (also referred to herein as pump casing). The flow ducts collectively define a flow conduit (e.g., a flow annulus) configured to contain liquid metal coolant flowing therein. The flow ducts may each have a radial thickness in order to possess some structural integrity in high pressure systems. Additionally, the flow ducts may be configured to separate received liquid metal coolant entering the flow conduit (e.g., activated sodium) from other pump components (also referred to herein as internal components) such as coils, stators, insulation, nitrogen gas, or the like. Similarly to the flow ducts, the pump casing may have some radial thickness in order to give the EMP some structural integrity and allow it to be lifted and orientated in various directions. The flow ducts may have sufficient thickness to accommodate a gamma shielding material therein, for example as a filler material within an annulus defined by cylindrical duct walls (e.g., stainless steel walls). The pump casing, and/or any structures thereof, may have sufficient thickness to accommodate a neutron absorber material therein, for example as a filler material within an annulus defined by cylindrical casing walls (e.g., stainless steel walls).

In some example embodiments, the EMP is configured to include the gamma shielding material in at least one flow duct at least partially defining a flow annulus through which the liquid metal coolant flows through the EMP, thereby shielding internal components of the EMP outside the flow annulus from gamma rays emitted by the liquid metal coolant. The gamma shielding material may include one or more materials including, without limitation, one or more of Lead, Iron and Steel-Alloys, Tin, Bismuth, Tungsten and its Alloys, Water, or Borated Paraffin or Polyethylene. In some example embodiments, the EMP is configured to include the neutron absorber material in at least a portion of the pump casing at least partially defining the outer surface and/or outer structure of the EMP, to absorb ambient neutrons received from the ambient environment external to the EMP and thereby reducing, minimizing, or preventing penetration of such ambient neutrons to the interior of the EMP to wear or damage internal components of the EMP. The neutron absorber material may include one or more materials including, without limitation, one or more of Gadolinium, Cadmium, Boron, Boron Carbide, Gadolinium oxide, Hafnium Lithium, Tantalum, Europium, Gadolinium Stainless Steel, Hafnium, Silver, Xenon, or Indium.

An EMP according to some example embodiments may include a neutron absorber material as a filler within a space (e.g., a casing annulus) within at least a portion of the pump casing of the EMP while using a gamma shielding material as a filler within a space (e.g., a duct annulus) within at least one flow duct of the inner or outer flow ducts at least partially defining the flow annulus through which liquid metal coolant may flow in the EMP. These neutron absorber materials and gamma shielding materials, when included in the EMP, may configure the EMP to have neutron absorption characteristics in low or high energy neutron fluxes, well characterized irradiated performance and thermophysical properties, and ability to support a long design reactor lifetime.

While the EMP according to some example embodiments may be included in a liquid metal cooled nuclear reactor, such as a liquid metal fast-cooled nuclear reactor, the EMP according to some example embodiments could be included in various other environments and for other purposes, such as fusion liquid metal blankets where liquid metals such as lithium or lithium-lead alloys are used as possible liquid metal coolants pumped by EMPs.

Based on the EMP including gamma shielding material and/or a neutron absorber material therein, the EMP may reduce, minimize, or prevent expensive radiation testing, allow many flexible reactor designs since the EMP can be located anywhere in the reactor vessel, and enhance heat transfer between pump components and liquid metal coolant to enable self-cooling of the EMP. Additionally, the EMP having the gamma shielding material and/or neutron absorber material according to some example embodiments may be configured to be easily and quickly implemented without requiring component program development or significant research efforts.

An EMP including a gamma shielding material and/or a neutron absorber material according to any of the example embodiments may be configured to reduce, minimize, or prevent pump material and/or component wear and/or damage (e.g., degradation and/or activation) due to radiation (e.g., received gamma rays and/or ambient neutrons from the ambient environment that is external to the EMP). The EMP may thus have an extended lifetime while being located in the nuclear reactor vessel, may enable improved flexibility in reactor design since the EMP can be located closer to the reactor core, thus decreasing the cost of the reactor vessel system, may enable reduction, minimization, or elimination of expensive irradiation testing to qualify insulation lifetime under temperature, voltage, and radiation conditions within an interior of a nuclear reactor, may reduce gamma ray and neutron exposure to EMP components (e.g., internal components) at high temperatures to thereby would improve EMP reliability, may be implemented in various configurations of EMPs, including self-cooling EMPs, without limitation from design, size, or performance requirements, may maintain compatibility with other pump components and reactor structural materials in terms of thermophysical and neutronic properties, and may reduce, minimize, or prevent activation in pump components, which would considerably allow quick maintenance and less complicated pump decommissioning procedures.

FIG. 1 is a schematic view of a nuclear plant that includes a liquid metal-cooled nuclear reactor, according to some example embodiments.

The nuclear plant 100 includes a liquid metal-cooled nuclear reactor (referred to herein as simply a "nuclear reactor") 110, a primary coolant loop 119, an intermediate coolant loop 160, a power supply 144 (e.g., a polyphase power supply), and an EMP control system 150. The primary coolant loop 119 includes an EMP 120 (e.g., an ALIP) that is electrically connected to the power supply 144 via a power cable 146 (e.g., a polyphase power cable, also referred to herein as one or more power conductors, power wires, etc.) configured to supply power (e.g., polyphase power) to the EMP 120.

The nuclear reactor 110 includes a nuclear reactor pressure vessel 111. The nuclear reactor pressure vessel 111 includes a nuclear reactor core 112 and multiple components within a volume space at least partially defined by an outer wall 111S. The multiple components comprise a primary coolant loop 119, also referred to herein as a primary loop. The primary coolant loop 119 may be configured to remove heat generated at the nuclear reactor core 112 as a result of nuclear reactions within the nuclear reactor core 112. The primary coolant loop 119 illustrated in FIG. 1 is configured to circulate a liquid metal coolant 190 through at least a portion of the nuclear reactor core 112 to remove, from the nuclear reactor core 112, heat generated at the nuclear reactor core 112 as a result of nuclear reactions within the nuclear reactor core 112. Such heat removal may also be referred to herein as core heat rejection.

As shown, the primary coolant loop 119 includes a primary heat exchanger 114. The primary heat exchanger 114 is configured to transfer heat from the liquid metal coolant 190 exiting the nuclear reactor core 112 to another coolant. The other coolant circulates through an intermediate coolant loop 160. The other coolant, in some example embodiments, may include a liquid metal coolant. Liquid metal coolants circulating through the primary and intermediate coolant loops may be a common liquid metal substance or different liquid metal substances.

The primary coolant loop 119 includes a suction reservoir 116, which may be referred to as a "cold" reservoir or pool. The suction reservoir 116 is configured to receive liquid metal coolant 190 that leaves the primary heat exchanger 114 subsequent to the liquid metal coolant 190 transferring core-generated heat to the intermediate coolant loop 160.

The primary coolant loop 119 includes an EMP 120. The EMP 120 is configured to operate to cause liquid metal coolant 190 to circulate through the nuclear reactor 110, as shown in FIG. 1. While FIG. 1 shows only one power supply 144 and one EMP 120 within the nuclear reactor 110, and the following description of FIG. 1 may refer to "a" or "the" EMP 120 and "a" or "the" power supply 144, it will be understood that multiple EMPs 120 may be included within the nuclear reactor 110, where at least some of the multiple EMPs 120 may be configured to operate in parallel or in series with each other to circulate liquid metal coolant through the nuclear reactor. Additionally, multiple power supplies 144 may be included in the nuclear plant 100, and each EMP 120 of multiple EMPs 120 in the nuclear reactor 110 may be electrically connected a same or different power supplies 144 as the other EMPs 120 within the nuclear reactor 110.

The EMP 120 is coupled, at an intake orifice or inlet 122, to the suction reservoir 116 via a suction line 121, also referred to herein as a pump inlet manifold. As shown in at least FIG. 2B, the EMP 120 may be further coupled, at the intake orifice or inlet 122, to the suction reservoir 116 via one or more fixed shield cylinders 204. The EMP 120 is coupled, at an outlet orifice or outlet 123, to a core inlet plenum 118 via one or more return lines 124, which are also referred to as one or more pump discharge pipes. The EMP 120 is configured to drive at least a portion of, or all of, the liquid metal coolant 109 to the core inlet plenum 118 and is further configured to generate at least a portion of, or all of, a pressure head, downstream of the EMP 120. The pressure head may provide a driving force to circulate the liquid metal coolant through the nuclear reactor core 112 as shown.

Figure 2A:
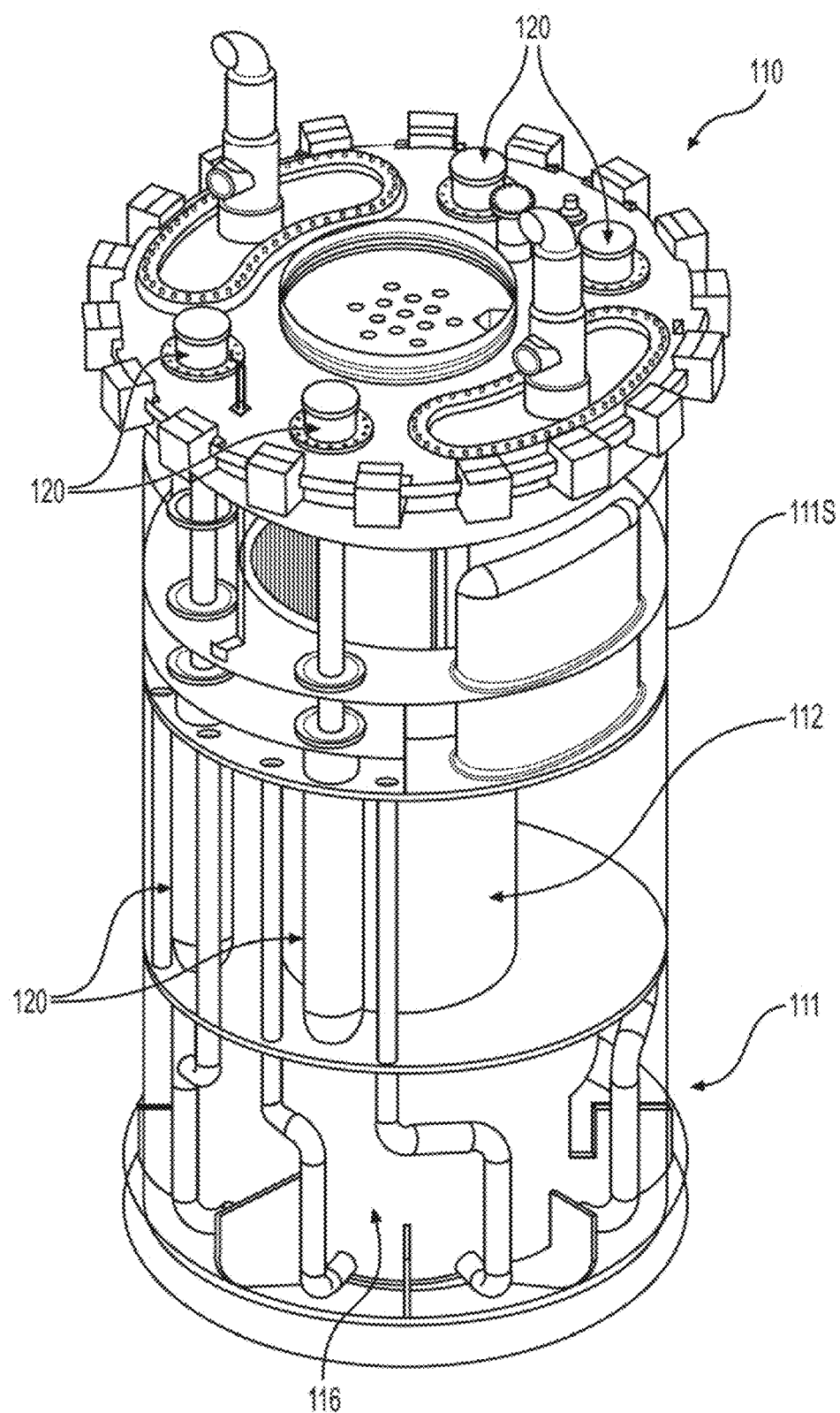
FIG. 2A is a perspective view of a liquid metal-cooled nuclear reactor, according to some example embodiments.
Figure 2B:
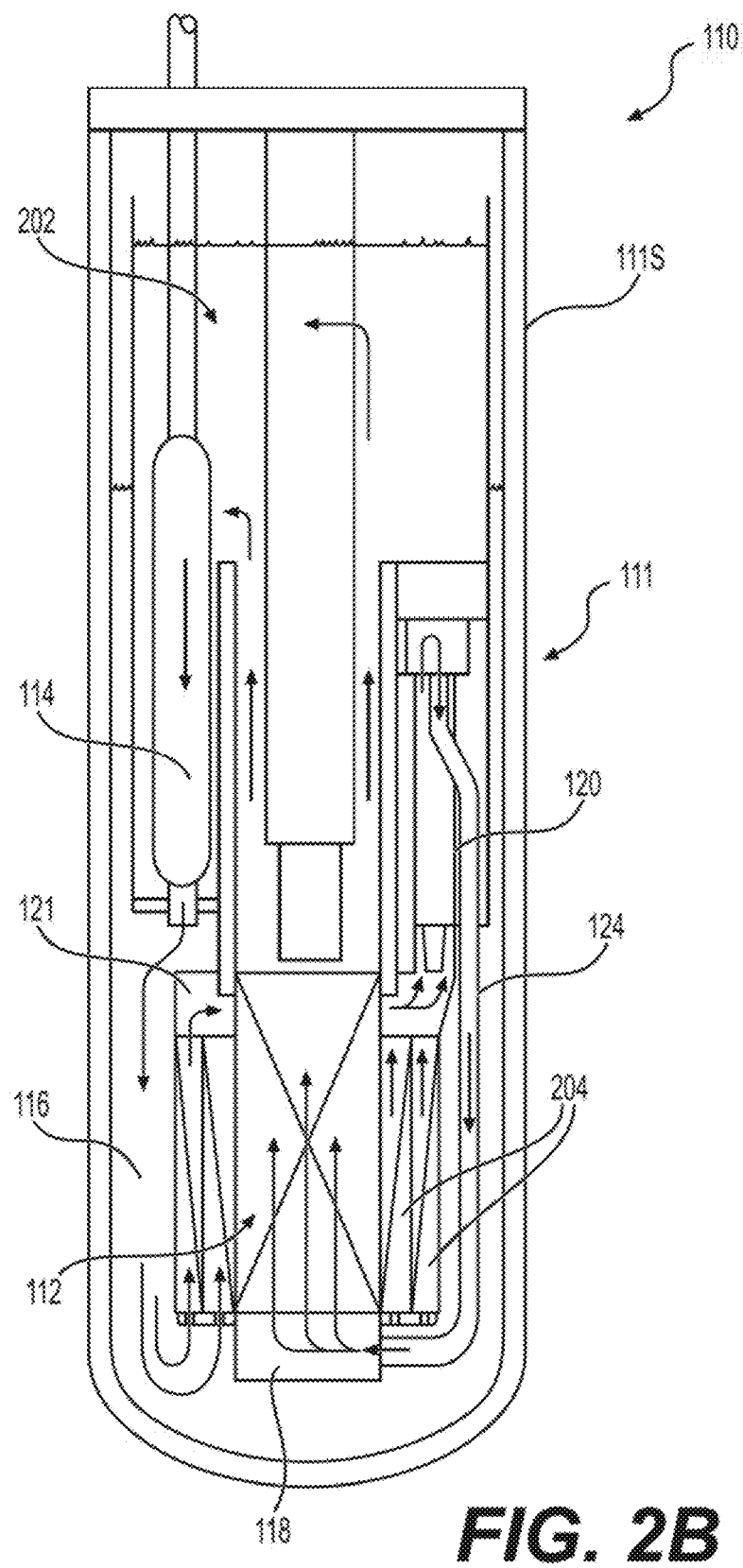
FIG. 2B is a plan view of a liquid metal-cooled nuclear reactor, according to some example embodiments.

As further shown in at least FIG. 2B, the nuclear reactor may include a "hot" reservoir 202, also referred to herein as a hot pool, in which liquid metal coolant exiting the nuclear reactor core 112 may circulate between the nuclear reactor core 112 and the primary heat exchanger 114, and "hot" liquid metal coolant may circulate from the hot reservoir 202 to the suction reservoir 116 via the primary heat exchanger such that the liquid metal coolant exiting the primary heat exchanger 114 into the suction reservoir may be "cold" liquid metal coolant that is colder than the hot liquid metal coolant in the hot reservoir 202.

The power supply 144 may be any power supply or power source configured to supply electrical power, including for example polyphase electrical power (e.g., three phase AC power). The power supply 144 may be an AC power supply. For example, the power supply 144 may be an adjustable speed drive, also called a variable speed drive, that is configured to receive AC ("alternating current") power at 60 Hz (e.g., from plant main power supply 140 and/or generator 141), convert the received AC power to DC ("direct current"), and then convert the power from DC to AC at a specific ("particular") current and frequency of polyphase electrical power to be supplied to the EMP 120.

As further shown, the power supply 144 is electrically coupled to one or more of a main power supply 140 of the nuclear plant 100 or a generator 141. In some example embodiments, the nuclear plant 100 includes one or more switchgear devices (not illustrated in FIG. 1) configured to selectively supply electrical power, to the power supply 144, from one or more of the main power supply 140 or one or more generators 141. A generator 141 may include one or more of a combustion engine, a fuel cell device, a battery, an uninterruptible power supply (UPS), some combination thereof, etc. The plant main power supply 140 may include a power supply configured to supply power generated based on the process fluid circulating through the power generation loop 170.

In some example embodiments, where the EMP 120 includes a plurality of induction coils configured to be electrically connected to the power supply 144 (e.g., a polyphase power supply) via a power cable 146 (e.g., a polyphase power cable, also referred to herein as a "multi-wire power line"), the power cable 146 may be configured to supply electrical power (e.g., polyphase electrical power) to the induction coils of the EMP 120. The power cable 146 may extend into the EMP 120 and may be electrically coupled to the induction coils of the EMP 120. Accordingly, the induction coils of the EMP 120 may be electrically connected to the power cable 146.

As shown in FIG. 1, the power cable 146 may be located in (e.g., at least partially or completely encased in, at least partially or completely enclosed in, or the like) a single power supply conductor 180 (also referred to herein as a "power supply conductor cable," "conduit," or "extension cable") that extends from the EMP 120 (e.g., at least a pump casing, also referred to herein as an outer housing, of the EMP 120) to at least an exterior of the nuclear reactor pressure vessel 111 through an opening or "penetration" 182 in the outer wall 111S of the nuclear reactor pressure vessel 111, so that the plurality of induction coils of the EMP 120 may be electrically coupled to the power supply 144 via the opening 182 in the outer wall 111S of the nuclear reactor pressure vessel 111. As a result, the electrical connection between the EMP within the nuclear reactor pressure vessel 111 and the power supply 144 outside of the nuclear reactor pressure vessel 111 may be accomplished with the opening 182 (e.g., penetration) through the nuclear reactor pressure vessel 111 sidewall.

While FIG. 1 illustrates the power supply conductor 180 extending through the opening 182 and further extending to the power supply 144, it will be understood that the power supply conductor 180 may terminate at any point outside the nuclear reactor pressure vessel 111 between opening 182 and the power supply 144, and the power cable 146 may extend out of the termination end of the power supply conductor 180 and continue to extend from the end of the power supply conductor 180 to the power supply 144.

The nuclear plant 100 includes an intermediate coolant loop 160, also referred to herein as a secondary coolant loop, secondary loop, or the like. The intermediate coolant loop 160 includes a flow of coolant circulating through lines 161 between the primary heat exchanger 114 and an intermediate heat exchanger 162. The intermediate coolant loop 160 may transfer core-rejected heat from the liquid metal coolant 190 circulating through the primary coolant loop 119 to a process fluid circulating through the power generation loop 170 via heat transfer at the intermediate heat exchanger 162. In some example embodiments, the coolant circulating through the intermediate coolant loop includes a liquid metal coolant. The liquid metal coolant circulating through the intermediate coolant loop may be similar or different in composition relative to a liquid metal coolant 190 circulating through the primary coolant loop 119.

The nuclear plant 100 includes a power generation loop 170 configured to circulate a process fluid that receives heat from the intermediate coolant loop 160 via heat exchanger 162 and performs work, including driving a turbine. The turbine may operate an electrical power generator. The process fluid may include water in one or more various phases. In some example embodiments, the power generation loop 170 comprises a steam generator device in which the intermediate heat exchanger 162 is at least partially located, and the heat exchanger 162 is configured to transfer heat from the coolant circulating through the intermediate coolant loop 160 to water located in the steam generator to vaporize the water and generate steam. The generated steam may be used to perform work, including driving a turbine connected to an electrical generator to generate electrical power.

In some example embodiments, a nuclear reactor includes one or more control systems configured to monitor and/or control operation of the EMP 120, including controlling the supply of electrical power (e.g., magnitude, frequency, etc.) to the induction coils within the EMP 120 in order to adjustably control the flow (e.g., the flow rate, which may be the mass flow rate and/or the volumetric flow rate) of liquid metal coolant 190 within the nuclear reactor 110, the performance of the nuclear reactor 110, and/or the operational efficiency of the nuclear reactor 110. As shown in FIG. 1, the nuclear reactor 110 may include an EMP control system 150. The EMP control system 150 may be communicatively coupled 151, via one or more communication lines, power transmission lines, etc., to the power supply 144. In some example embodiments, the EMP control system 150 may be communicatively coupled, via one or more communication lines, power transmission lines, etc., to one or more sensor devices (e.g., a sensor, which may be one or more flowmeters such as one or more Venturi flow meters that may be configured to generate sensor data indicating a flow rate of liquid metal coolant 190 through the suction line 121, return line 124, and/or the EMP 120, one or more pressure sensors that may be configured to generate sensor data indicating a pressure of liquid metal coolant 190 at one or more locations in the suction line 121, return line 124, and/or the EMP 120, or the like) and/or devices within the nuclear reactor pressure vessel 111, including for example the EMP 120, but example embodiments are not limited thereto.

The EMP control system 150 may, in some example embodiments, be coupled to one or more sensor devices (e.g., a sensor, which may be one or more flowmeters such as one or more Venturi flow meters that may be configured to generate sensor data indicating a flow rate of liquid metal coolant 190 through the suction line 121, return line 124, and/or the EMP 120, one or more pressure sensors that may be configured to generate sensor data indicating a pressure of liquid metal coolant 190 at one or more locations in the suction line 121, return line 124, and/or the EMP 120, or the like) configured to generate sensor data associated with one or more of the power supply 144, the EMP 120, or the like.

The EMP control system 150 may monitor the operation of the EMP 120, based on monitoring information associated with the power supply 144, one or more sensor devices (which may be one or more flowmeters such as one or more Venturi flow meters that may be configured to generate sensor data indicating a flow rate of liquid metal coolant 190 through the suction line 121, return line 124, and/or the EMP 120, one or more pressure sensors that may be configured to generate sensor data indicating a pressure of liquid metal coolant 190 at one or more locations in the suction line 121, return line 124, and/or the EMP 120, or the like), the EMP 120, etc. For example, the EMP control system 150 may receive sensor data generated by one or more sensor devices, where the sensor data may include information indicating a flow of electrical power from a given power supply to a given multistage EMP 120. In another example, the EMP control system 150 may receive sensor data generated by one or more sensor devices, where the sensor data may include information indicating a strength of a magnetic field generated by induction coils of a given EMP 120.

The EMP control system 150 may be configured to control operation of an EMP 120, for example to control the flow rate of liquid metal coolant through the EMP 120, based on independently controlling and/or adjusting the supplying of electrical power by the power supply 144. For example, where the EMP 120 includes a plurality of induction coils that are electrically connected to the power supply 144 via a power cable 146, the EMP control system 150 may independently control and/or adjust the electrical power (e.g., the polyphase electrical power) supplied by the power supply 144 to control the EMP 120. Such control of the power supply 144 may include causing the power supply 144 to initiate a supply of polyphase electrical power to the induction coils of the EMP 120 via the power cable 146, causing the power supply 144 to adjust a frequency and/or current of the electrical power supplied by the power supply 144, and/or causing the power supply 144 to inhibit a supply of electrical power to the electrically connected induction coils of the EMP 120 via the power cable 146. Such control may be implemented based on the EMP control system 150 generating a control signal and transmitting the control signal to the power supply 144, based on the EMP control system 150 executing code stored on a memory.

The EMP control system 150, in some example embodiments, includes one or more computer systems. A computer system may include one or more instances of circuitry. The one or more instances of circuitry may include one or more processor devices ("processors") coupled to one or more instances (e.g., articles, units, etc.) of memory. The one or more processors may include one or more central processor units (CPUs). The one or more processors may be configured to implement the EMP control system. For example, the one or more instances of memory (e.g., one or more memories) may include a non-transitory computer-readable medium storing a program of instructions (e.g., a solid stage drive), and the one or more processors may include processing circuitry configured to execute the program of instructions stored on the non-transitory computer-readable medium to perform one or more operations of any of the methods according to any of the example embodiments.

In some example embodiments, an EMP 120 provides improved flexibility and control over the liquid metal coolant flow rate in the primary coolant loops 119, as the EMP control system 150 can apply more flexible control over the flow rate based on controlling the EMP 120 based on controlling the polyphase electrical power that is supplied by the power supply 144 to the separate induction coils of the EMP 120. Various configurations (e.g., parameters) of polyphase electrical power supplied to the EMP 120 may increase the range of operational states of the EMP 120 that can be achieved by the EMP control system 150, including an increased range (e.g., increased quantity) of separate, discrete flow rates of the liquid metal coolant 190 that can be induced by the EMP 120. As a result, operational performance and/or efficiency of the primary coolant loop 119, and thus the nuclear reactor 110 and nuclear plant 100 as a whole, may be improved based on the improved control over the liquid metal coolant 190 flow that is enabled by the EMP 120.

In some example embodiments, and as described herein the EMP 120 may be self-cooling and configured to reject heat therefrom without including an additional and/or separate coolant circulating through an interior of the EMP 120. For example, the EMP 120 may be configured to conduct heat generated by internal components thereof (e.g., stators, induction coils, etc.) to a flow conduit (e.g., flow annulus) through which the liquid metal coolant 190 flows in the EMP 120, so that the liquid metal coolant 190 absorbs the conducted heat and remove the heat from the EMP 120 when the liquid metal coolant 190 exits the EMP 120 via the outlet 123.

In some example embodiments, the intermediate coolant loop 160 includes one or more EMPs 120 which are illustrated to be included in the primary coolant loop 119. An EMP 120 included in the intermediate coolant loop 160 may be configured to operate similarly to the EMP 120 included in the primary coolant loop 119. A set of one or more EMPs 120 included in the intermediate loop may be located internal or external to the nuclear reactor pressure vessel 111.

As referred to herein, the liquid metal coolant may include one or more various liquid metal substances, including one or more of sodium, mercury, lead, bismuth, or tin. The one or more liquid metal substances may be conductive metal substances, such that an EMP 120 is configured circulate the liquid metal coolant.

FIG. 2A is a perspective view of a liquid metal-cooled nuclear reactor, according to some example embodiments. FIG. 2B is a plan view of a liquid metal-cooled nuclear reactor, according to some example embodiments. The nuclear reactor 110 illustrated in FIGS. 2A-2B may be included in any of the embodiments of nuclear reactors included herein, including the nuclear reactor 110 shown in FIG. 1.

As shown in FIGS. 2A-2B, a nuclear reactor 110 may include a nuclear reactor pressure vessel 111 and may further include, within the nuclear reactor pressure vessel 111, a set of multiple EMPs 120, although it will be understood that in some example embodiments only a single EMP 120 may be included within the nuclear reactor pressure vessel 111. As shown in FIGS. 2A-2B, where the nuclear reactor 110 includes multiple EMPs 120, the EMPs 120 may be coupled in parallel to separate, parallel return lines 124 and may be configured to operate in parallel in the primary coolant loop 119 such that each EMP 120 may induce parallel flows of separate portions of the liquid metal coolant 190 through the primary coolant loop 119.

Each of the EMPs 120 shown in FIGS. 2A-2B may be structurally identical or different from each other. For example, the EMPs 120 may have identical configurations of induction coils, component structures, and/or component intrinsic properties. In some example embodiments, the EMPs 120 may have different configurations of induction coils, component structures, and/or component intrinsic properties.

Figures 3A, 3B:
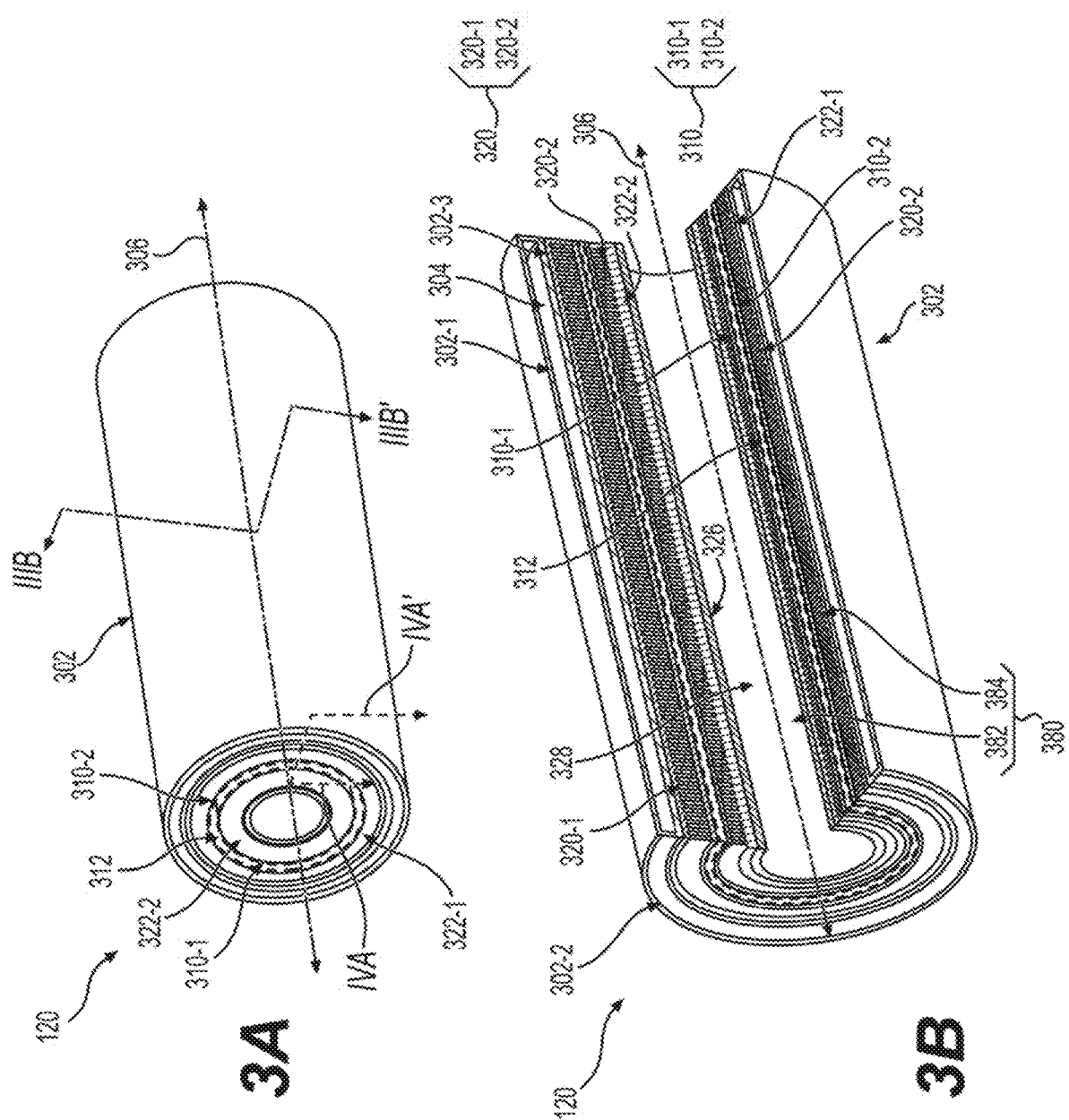
FIG. 3A is a perspective view of an EM Pump (EMP), according to some example embodiments.
FIG. 3B is a perspective cross-sectional view along cross-sectional view line IIIB-IIIB' shown in FIG. 3A, according to some example embodiments.
Figure 4A:
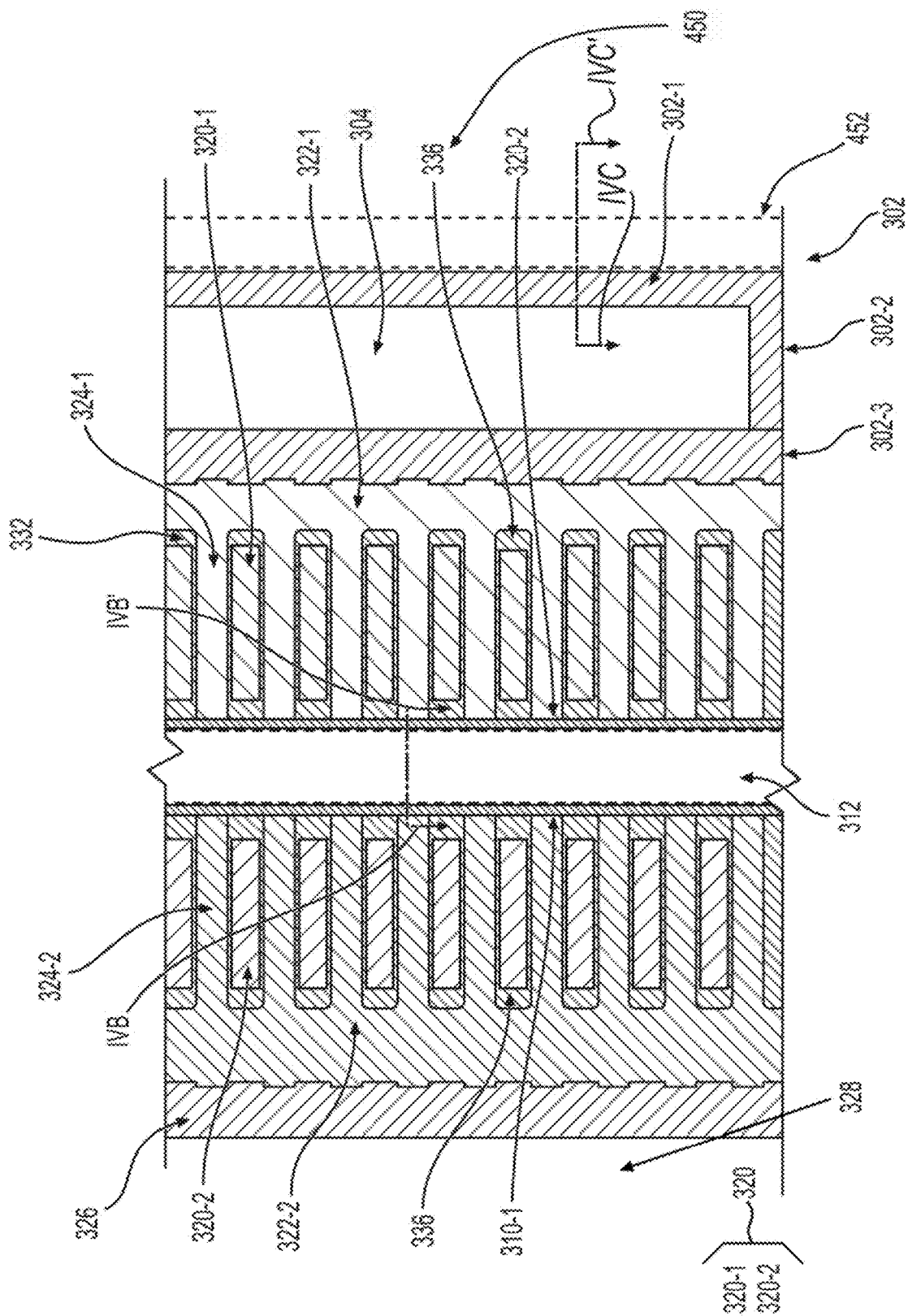
FIG. 4A is a cross-sectional view of the EMP of FIG. 3A along cross-sectional view line IVA-IVA' shown in FIG. 3A, according to some example embodiments.
Figure 4B:
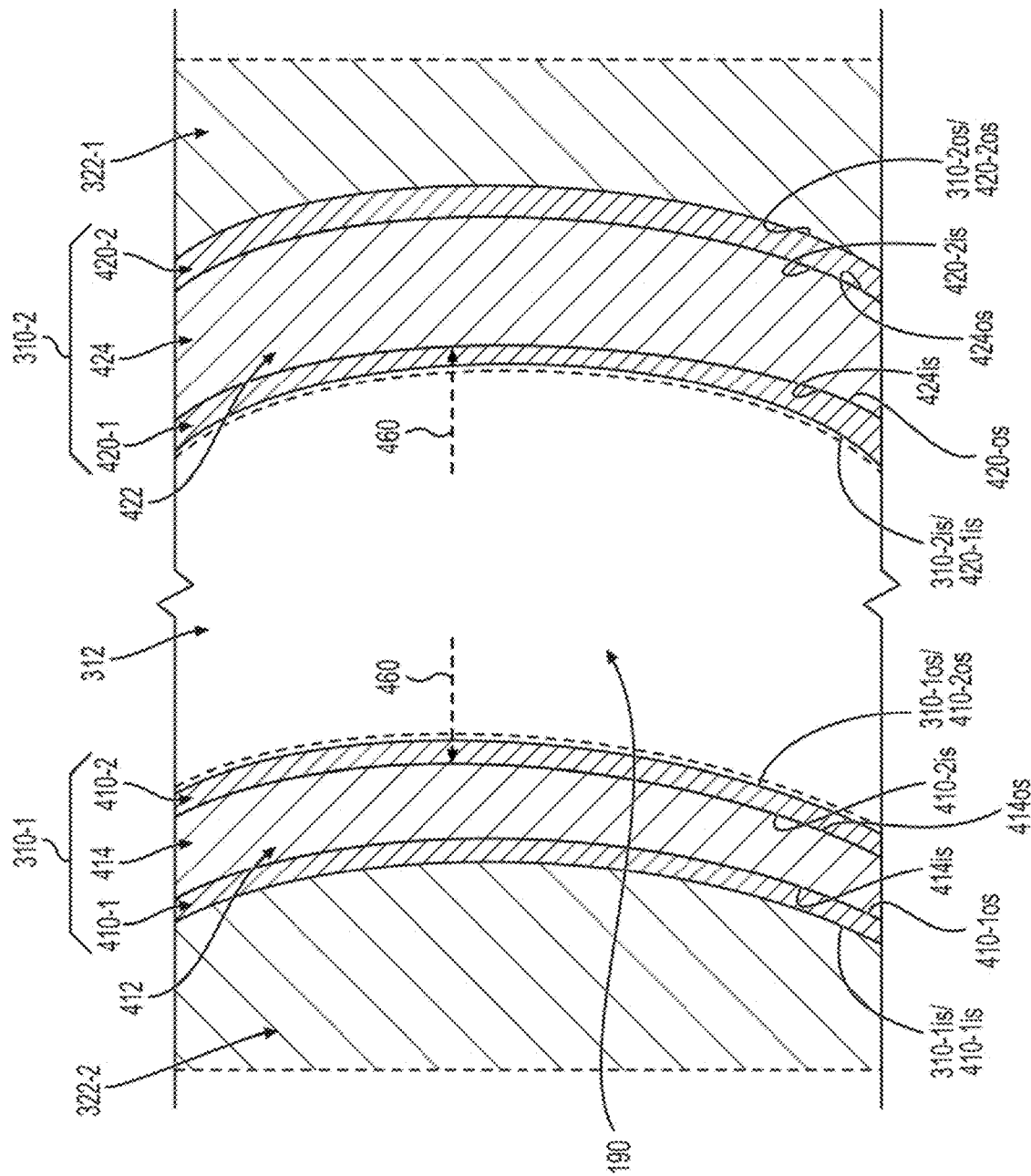
FIG. 4B is a cross-sectional view of the EMP of FIG. 4A along cross-sectional view line IVB-IVB' shown in FIG. 3A, according to some example embodiments.
Figure 4C:
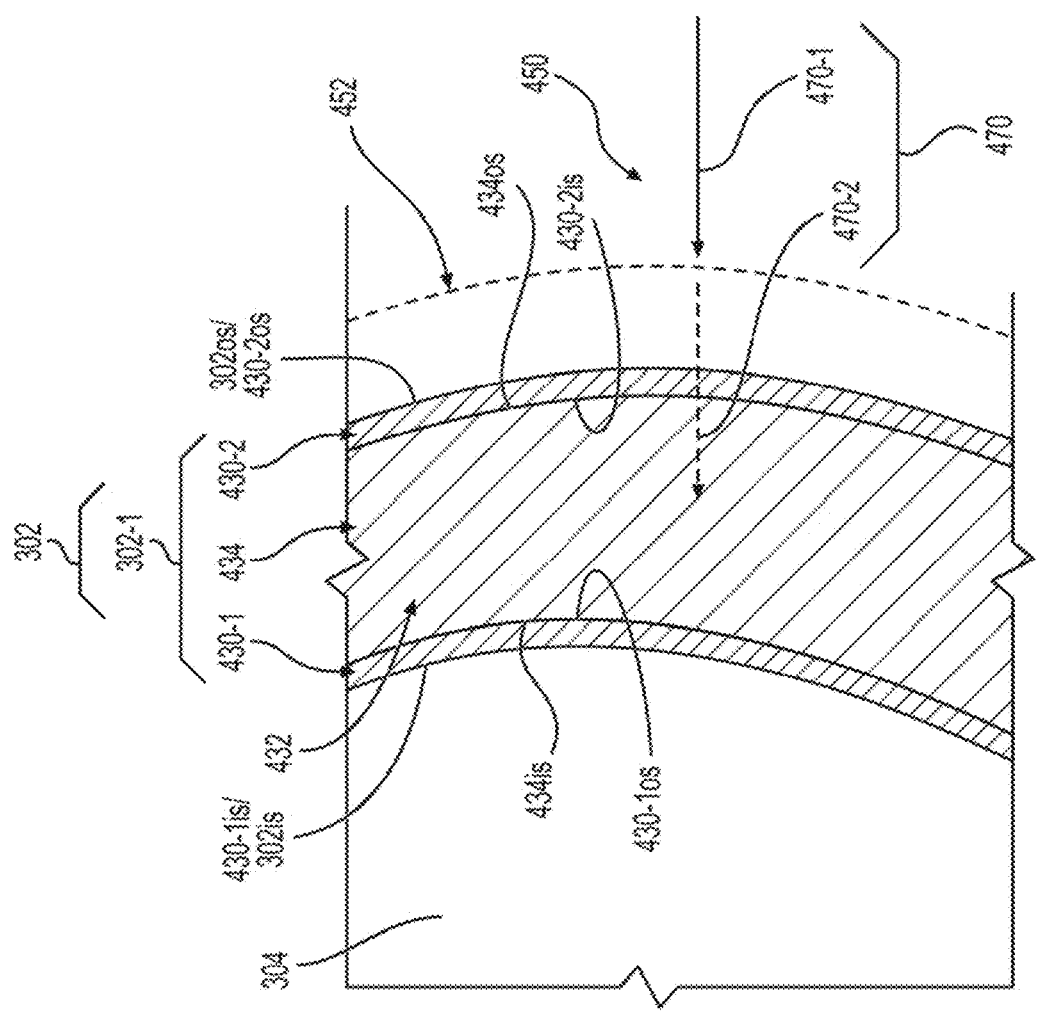
FIG. 4C is a cross-sectional view of the EMP of FIG. 4A along cross-sectional view line IVC-IVC' shown in FIG. 3A, according to some example embodiments.
Figure 4D:
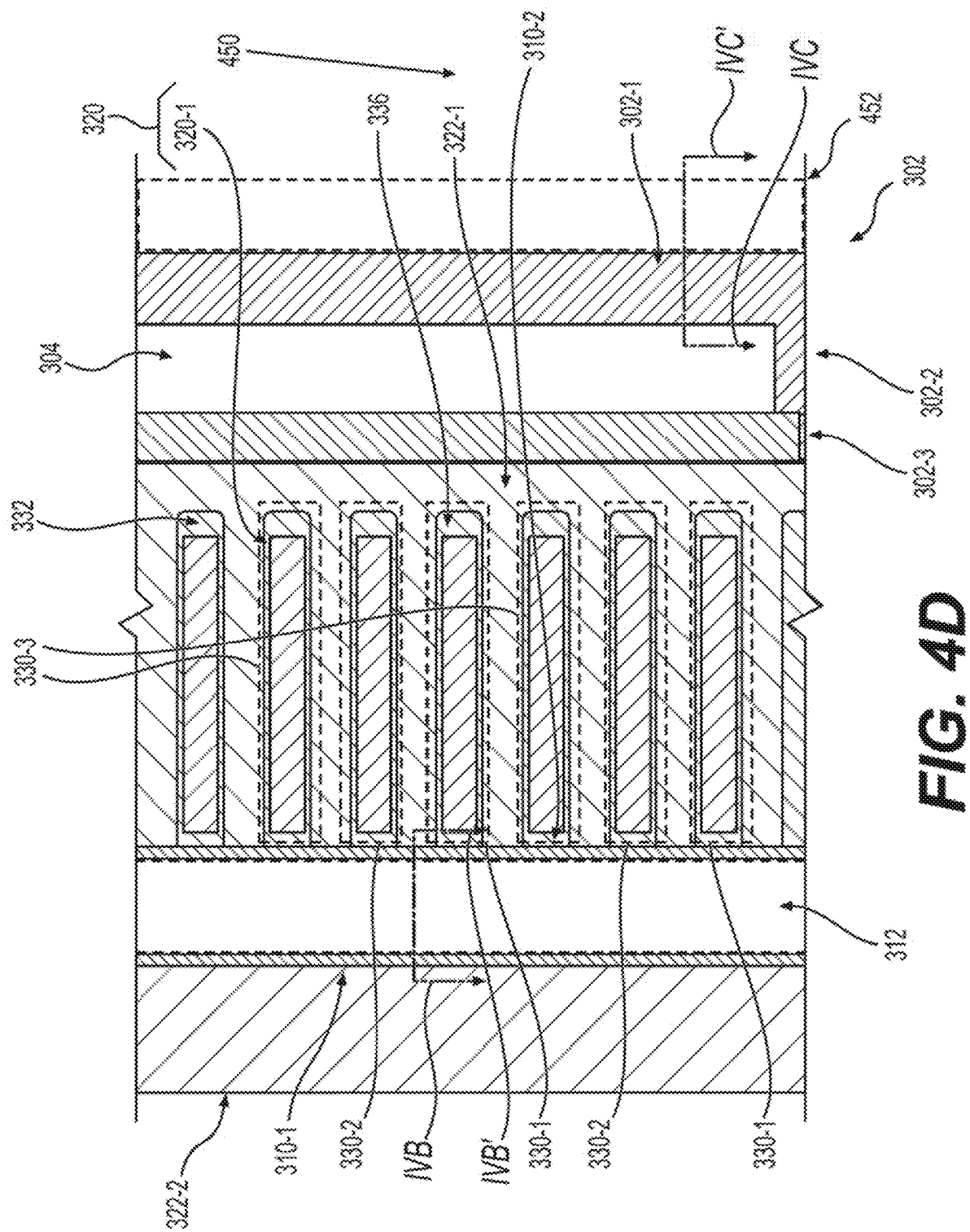
FIG. 4D is a cross-sectional view of the EMP of FIG. 3A along cross-sectional view line IVA-IVA' shown in FIG. 3A, according to some example embodiments.

FIG. 3A is a perspective view of an EM Pump (EMP), according to some example embodiments. FIG. 3B is a perspective cross-sectional view along cross-sectional view line IIIB-IIIB' shown in FIG. 3A, according to some example embodiments. FIG. 4A is a cross-sectional view of the EMP of FIG. 3A along cross-sectional view line IVA-IVA' shown in FIG. 3A, according to some example embodiments. FIG. 4B is a cross-sectional view of the EMP of FIG. 4A along cross-sectional view line IVB-IVB' shown in FIG. 3A, according to some example embodiments. FIG. 4C is a cross-sectional view of the EMP of FIG. 4A along cross-sectional view line IVC-IVC' shown in FIG. 3A, according to some example embodiments. FIG. 4D is a cross-sectional view of the EMP of FIG. 3A along cross-sectional view line IVA-IVA' shown in FIG. 3A, according to some example embodiments.

The EMP 120 shown in FIGS. 3A-4C and the EMP 120 shown in FIG. 4D may be included in any of the EMPs 120 included herein, including the one or more EMPs 120 illustrated in FIG. 1 and/or FIGS. 2A-2B. While the EMPs 120 shown in FIGS. 3A-4D may be an ALIP, example embodiments of the EMP are not limited to an ALIP and may include any type of EMP.

The EMP 120 shown in FIGS. 3A-4C is illustrated as a dual-stator EMP, but example embodiments are not limited thereto and the description herein with regard to any EMP 120 and any portion thereof may be applied to any EMP 120 having more or fewer than two stators, such as the single-stator EMP shown in FIG. 4D.

Referring to FIGS. 3A-4D, an EMP 120 may include a pump casing 302 (also referred to as an outer housing, outer casing, casing structure, etc.) having a central longitudinal axis and extending in a longitudinal direction. As shown in FIGS. 3A-3B, the pump casing 302 may partially or fully define (e.g., at least partially define) an interior space (e.g., interior 380) of the EMP 120. As further shown, the central longitudinal axis of the pump casing 302 may be paraxial to and/or may be coaxial with (e.g., may be the same as and/or may at least partially define) the longitudinal axis 306 of the EMP 120.

While the pump casing 302 may include one or more structures (e.g., one or more pieces of material) and/or may be open at the opposite longitudinal ends of the EMP 120, it will be understood that in some example embodiments the pump casing 302 may include one or more structures which may partially or fully seal the opposite longitudinal ends of the interior space, except for openings in the pump casing 302 that define the inlet 122 and outlet 123 of the EMP 120. For example, as shown in at least FIGS. 3A-3B, 4A, and 4D, the pump casing 302 may include an outer sidewall structure 302-1, which may be a hollow cylinder structure, and which may at least partially define an interior 380 of the EMP 120 as a hollow cylindrical volume. The pump casing 302 may further include respective ring-shaped end structures 302-2 that at least partially structurally enclose the inlet-side longitudinal end of the EMP 120 and/or the outlet-side longitudinal end of the EMP 120, except for one or more openings to an inlet-side longitudinal end of the flow annulus 312 and/or an outlet-side longitudinal end of the flow annulus 312, where the one or more openings (e.g., one or more arcuate and/or annular openings) at least partially define the inlet 122 into the flow annulus 312 and/or the outlet 123 of the flow annulus 312 and thus into and/or out of the EMP 120. While the end structures 302-2 are shown as being separate structures (e.g., separate pieces of material) from the outer sidewall structure 302-1, example embodiments are not limited thereto and in some example embodiments the end structures 302-2 and the outer sidewall structure 302-1 may each include separate portions of a single, unitary piece of material. In some example embodiments, the end structures 30-2 may be omitted from the pump casing 302. As shown in at least FIGS. 3A-3B, the pump casing 302 (e.g., at least the outer sidewall structure 302-1 may have a longitudinal axis extending in a longitudinal direction that at least partially defines (e.g., is coaxial with, is the same as, etc.) the longitudinal axis 306 of the EMP 120.

Still referring to at least FIGS. 3A-3B, 4A, and 4D, the pump casing 302 may include an inner sidewall structure 302-3 that, collectively with the outer sidewall structure 302-3, at least partially define an outer annular space 304 extending coaxially with the longitudinal axis 306. The outer annular space 304 may include an empty space and/or may include one or more materials, such as one or more thermal insulation materials, one or more electrical insulation materials, or the like. In some example embodiments, the inner sidewall structure 302-3 may be omitted. In some example embodiments, the pump casing 302 may comprise the outer sidewall structure 302-1 alone or in combination with one or more end structures 302-2. In some example embodiments, the inner sidewall structure 302-3, the end structures 302-2, and the outer sidewall structure 302-1 may include separate pieces of material and/or may each include separate portions of a single, unitary piece of material.

The pump casing 302, the inlet-side structure 302-1, and/or the outlet-side structure 302-2, may comprise one or more metal materials, for example stainless steel (e.g., 304 stainless steel), carbon steel, or the like.

As shown in FIGS. 3A-3B, an EMP 120 may include concentric flow ducts 310, extending coaxially with the longitudinal axis 306 and collectively defining a flow annulus 312 extending coaxially with the longitudinal axis 306 along the length (e.g., the entire length as shown in FIG. 3A) of the EMP 120. As shown, the concentric flow ducts 310 may include an inner flow duct 310-1 and an outer flow duct 310-2, each of which may be a cylindrical structure (e.g., a cylindrical tube, a hollow cylinder structure, or the like), although example embodiments are not limited thereto. As shown, an outer surface 310-1os of the inner flow duct 310-1 and an inner surface 310-2is of the outer flow duct 310-2 collectively define the flow annulus 312 as an annular space, or "annulus," between these surfaces. As shown in FIGS. 3A-3B, the concentric flow ducts 310 (also referred to herein as concentric annular walls) may each be a cylindrical tube, but example embodiments are not limited thereto.

Still referring to FIGS. 3A-3B, the EMP 120 may include a plurality of induction coils 320 (which may include, for example coils of wound copper wire) within the interior space of the EMP 120. As shown, each induction coil 320 surrounds the longitudinal axis 306 and has a central axis that is coaxial with the longitudinal axis 306. As shown in at least FIGS. 3B, 4A, and 4D, the induction coils 320 are spaced apart from each other (e.g., isolated from direct contact with each other) in the longitudinal direction extending paraxial with the longitudinal axis 306. In some example embodiments, the induction coils 320 may be referred to as "solenoids" of a stator of the EMP 120. The induction coils 320 may each comprise one or more conductive materials (e.g., windings of one or more conductive materials), including copper, silver, or the like.

As further shown in FIGS. 3A-3B, 4A, 4B, and 4D, the EMP 120 may include stators 322, including an outer stator 322-1 that is located radially distal to the longitudinal axis 306 in relation to the outer flow duct 310-2 and an inner stator 322-2 that is located radially proximate to the longitudinal axis 306 in relation to the inner flow duct 310-1. The stators 322 comprise one or more magnetic materials, for example magnetic iron. The outer stator 322-1 and the inner stator 322-2 may comprise a same material composition or different material compositions. For example, the outer stator 322-1 and the inner stator 322-2 may each comprise iron (e.g., magnetic iron), but example embodiments are not limited thereto. For example, at least one of the outer stator 322-1 or the inner stator 322-2 may at least partially comprise stainless steel in some example embodiments.

While each of the outer stator 322-1 and the inner stator 322-2 are shown to be a single structure, at least one of the outer stator 322-1 or the inner stator 322-2 may comprise a plurality of stator structures (e.g., block structures), for example eight block structures. The block structures may be linear beam or rod-shaped structures (e.g., linear beam or rod-shaped block structures) that each extend paraxial to the longitudinal axis 306 along the length of the EMP 120 and may be at least partially spaced apart azimuthally around the longitudinal axis 306. In some example embodiments, the outer stator 322-1 may comprise one or more arcuate structures, or a single cylindrical structure that extends around some or all of the circumference of the outer surface 310-2os of the outer flow duct 310-2. However, an outer stator 322-1 that includes multiple, spaced-apart block structures may provide weight savings in the EMP 120 in relation to an outer stator 322-1 that is a single-piece cylindrical structure.

As shown in FIGS. 3A-3B, 4A-4B, and 4D, in some example embodiments, the inner stator 322-2 may comprise a singular cylindrical structure that extends around the longitudinal axis 306 and further extends in the longitudinal direction coaxially with the longitudinal axis 306.

Referring to FIGS. 3A-4D, the EMP 120 may include a plurality of induction coils 320 which may include at least one of inner induction coils 320-2 located within a central region 382 of the EMP 120 interior 380 that is at least partially defined by an inner surface 310-1is of the inner flow duct 310-1, or outer induction coils 320-1 located within an annular region 384 of the EMP 120 interior 380 that is at least partially defined between an outer surface 310-2*os* of the outer flow duct 310-2 and an inner surface 302 is of the pump casing 302.

As shown in at least FIGS. 3B and 4A and 4D, the outer stator 322-1 may include longitudinally-spaced tooth structures 324-1 configured to receive and enclose separate induction coils 320 (e.g., outer induction coils 320-1) therebetween in at least the longitudinal direction paraxial to the longitudinal axis 306 and a radial direction distally from the longitudinal axis 306. As shown in at least FIGS. 3B and 4D, in example embodiments where the EMP 120 is a double-stator EMP having inner induction coils 320-2, the inner stator 322-1 may include longitudinally-spaced tooth structures 324-2 configured to receive and enclose separate inner induction coils 320-2 therebetween in at least the longitudinal direction paraxial to the longitudinal axis 306 and a radial direction distally from the longitudinal axis 306. As shown in at least FIG. 4D, in example embodiments where the EMP 120 is a single-stator EMP 120, the inner stator 322-2 may be a hollow cylindrical structure.

As shown, each tooth structure 324-1 or 324-2 may define, together with a proximate flow duct 310, an annular space 332 in which a separate induction coil 320 may be located. A remainder of the annular space 332 not occupied by the induction coil 320 may include an electrical insulation material 336 that surrounds the induction coil 320. Such electrical insulation material 336 may partially or completely fill the remainder of the annular space 332 not occupied by the induction coil 320. Such electrical insulator material 336 may include any known electrical insulation material, including for example, polyvinyl chloride (PVC). The electrical insulation material 336 may be thermally conductive and may be further configured to conduct heat from the induction coils 320 and/or the stators 322 to the flow annulus 312 via the flow ducts 310 to facilitate self-cooling of the EMP 120 based on rejecting internally-generated heat to the liquid metal coolant 190 flowing through the flow annulus 312. For example, in some example embodiments, the electrical insulation material 336 may include any known electrically insulating, thermally conductive material, including for example Mica (Phyllosilicate)). The electrical insulation material 336 may conduct heat generated at any of the induction coils 320 and/or the stators 322 to the flow ducts 310 to enable the heat to be conducted through the flow ducts 310 into the flow annulus 312 to be absorbed by liquid metal coolant 190 flowing therethrough, thereby enabling self-cooling of the EMP 120 internal components via heat rejection to the liquid metal coolant 190 flowing therethrough and exiting the EMP 120 via the outlet 123.

Still referring to FIGS. 3A-3B, 4A, and 4D, in some example embodiments, the EMP 120 may include a central core 326 (which may comprise a material such as stainless steel, magnetic iron, or the like) which may be a hollow cylindrical structure having one or more inner cylindrical sidewall surfaces that define a central space 328 (e.g., central void) that extends coaxially with the longitudinal axis 306 (e.g., located at a radial center of the EMP 120). In some example embodiments, the central core 326 may be omitted, such that the inner stator 322-2 includes one or more inner cylindrical sidewall surfaces that define the central space 328 (e.g., central void) as described herein. The central space 328 may be configured to accommodate (e.g., house) cabling for the EMP 120), may be configured to direct a heat exchange fluid (e.g., coolant gas, such as helium) therethrough to provide cooling to the EMP 120, or the like. In some example embodiments, the central core 326 or the inner stator 322-2 may be a solid cylindrical structure that occupies some or all of the space defined by the inner diameter of the inner flow duct 310-1, such that the central space 328 may be omitted from the EMP 120.

In some example embodiments, the outer annular space 304 (e.g., an outer void) at least partially defined by the outer sidewall structure 302-1 may extend around the outer stator 322-1 and induction coils 320 (e.g., radially distally therefrom) and between the inner surface 302*is* of the pump casing and outer surfaces of the induction coils 320 and/or outer stator 322-1. The outer annular space 304 may be an empty space and/or may be at least partially filled with a material (e.g., nitrogen gas, insulation material, circuitry, or the like.

Still referring to FIGS. 3A-3B, the inner flow duct 310-1, inner stator 322-2, central core 326, and/or any structures located radially inward from the inner flow duct 310-1 in the EMP 120 may be structurally connected to the outer flow duct 310-2, outer stator 322-1, induction coils 320, pump casing 302, and/or any structures located radially outward from the outer flow duct 310-2 in the EMP 120 via one or more support ribs (also referred to as "stilts") extending radially outward between the concentric flow ducts 310 in the flow annulus 312 to structurally connect the inner and outer flow ducts 310-1 and 310-2 to each other, thereby structurally coupling the central/inner portion of the EMP 120 to the outer portion of the EMP 120 and thus structurally stabilizing and supporting the central/inner portion (e.g., inner flow duct 310-1, inner stator 322-2, inner induction coils 320-2, etc.) in relation to the outer portion (e.g., outer flow duct 310-2, outer stator 322-1, outer induction coils 320-1, pump casing 302, etc.). In some example embodiments, support ribs may further extend through the outer annular space 304 between the outer stator 322-1 and the pump casing 302 to structurally stabilize and support at least the outer stator 322-1 in relation to the pump casing 302. In some example embodiments, support ribs may be omitted from the EMP 120. The pump casing 302 may include an inlet-side end structure 302-2 and an outlet-side end structure 302-2 which are coupled to the outer sidewall structure 302-1 of the pump casing 302 that has the longitudinal axis 306, where end structures 302-2 may be structurally connected to one or both of the outer portion of the EMP 120 (e.g., the outer flow duct 310-2, outer stator 322-1, and/or outer induction coils 320-1) and the central/inner portion of the EMP 120 (e.g., the inner flow duct 310-1, inner stator 322-2, inner induction coils 320-2, and/or central core 326) and thus the inlet-side end structure 302-2 and outlet-side end structure 302-2 may structurally couple, stabilize, and support the outer and central/inner portions of the EMP 120 in relation to each other.

Still referring to FIGS. 3A-4D, the EMP 120 may be configured to pump (e.g., induce flow) of liquid metal coolant 190 through the flow annulus 312 based on applying electromagnetic forces on the flowing liquid metal coolant 109 through the length (e.g., longitudinal direction extending paraxially to the longitudinal axis 306) of the EMP 120. This may be performed based on applying (e.g., supplying) electrical power (e.g., polyphase electrical power) to the induction coils 320 at particular frequencies and phase angles. For example, polyphase electrical power as described herein may include AC power, for example three phase AC power, which may be applied at specified AC frequencies and phase angles to induction coils 320 that surround the flow annulus 312.

For example, referring to FIG. 4D, the induction coils 320 may include multiple separate sets, or "slots" 330-1 to 330-3 of induction coils 320, a fixed phase of polyphase electrical power from a particular, electrically connected polyphase power source may be applied to each induction coil 320, and the phase of a given induction coil in a given set (e.g., 330-1, 330-2, or 330-3) may be the phase of the previous longitudinally adjacent induction coil 320 (in a direction opposite the longitudinal direction paraxial to the longitudinal axis 306), plus 60 or 120 degrees, to allow for a sequence, in the longitudinal direction, of induction coils 320, to complete an AC cycle of 360 degrees. The collection of induction coils 320 that complete this 360 degree AC cycle is called a pole (T) or a "slot". The length of a pole is called the pole pitch (T).

The supply of polyphase electrical power to the induction coils 320 may be controlled, for example based on controlling a frequency, power amplitude (e.g., current and/or voltage), and/or phase angles of the supplied polyphase electrical power, in order to cause a specific pressure rise in the liquid metal coolant 190 in the flow annulus 312 along the length of the EMP 120 (e.g., in the longitudinal direction that is paraxial to the longitudinal axis 306). With the electrical phase of each induction coil 320 being fixed based on connection to a separate wire of a particular power cable 146, and the internal components being stationary within the pump casing 302, the pressure rise may be controlled based on controlling and/or adjusting the frequency, power amplitude (e.g., current and/or voltage), and/or phase angles of the polyphase electrical power supplied from an electrically connected polyphase power supply (e.g., power supply 144) to the induction coils 320.

Given a volumetric flow rate, the applied current, voltage, and/or frequency of polyphase electrical power (e.g., three-phase AC power) supplied to a given set of induction coils 320 may be adjusted to provide a desired pressure rise in the liquid metal coolant 190 in a EMP 120. This is because the current and frequency changes of the power supplied by a polyphase power supply (e.g., power supply 144) are applied to every induction coil 320 that is electrically connected to that same polyphase power supply. Accordingly, the flow operating range and sensitivity of an EMP 120 may be therefore based on the polyphase power supply(ies) to which the induction coils 320 are electrically connected via a power cable 146.

Still referring to FIGS. 4D, while the induction coils 320 are shown to include three "slots" 330-1 to 330-3, it will be understood that greater or fewer repeating "slots" may be present in the EMP 120, such that the number of slots associated with a given phase may be a plurality of "N" slots 330-1 to 330-N of induction coils 320, "N" being any positive integer.

Still referring to FIG. 4D, the induction coils 320 may be connected via a polyphase power cable 146 (e.g., a three-phase conductor delivering phases A, B, C of three-phase AC power from a polyphase power supply 144) and thus may be controlled based on independently controlling the power supplied by the polyphase power supply 144. Referring to FIGS. 3A-4A, in a dual-stator EMP 120, the inner and outer induction coils 322-2 and 322-1 at a given longitudinal position along the longitudinal axis 306 may be coupled to the same or separate phases of polyphase electrical power provided by a polyphase power supply.

Referring generally to FIGS. 3A-4D, polyphase electrical power (e.g., three phase AC power) may be applied to the induction coils 320 of the EMP 120 where the phase and current directions for each induction coil 320 are fixed, or predetermined, so that the application of polyphase electrical power to the induction coils 320 causes the induction coils 320 to generate a travelling electromagnetic (EM) wave that induces a continuous flow of liquid metal coolant 190 located in the flow annulus 312 in the longitudinal direction paraxial to the longitudinal axis 306 from the inlet 122 to the outlet 123. The polyphase electrical power applied to one or more sets 330-1 to 330-3 of induction coils 320, may have a particular frequency and power amplitude (e.g., current and/or voltage) which may be set (e.g., controlled and/or adjusted) by EMP control system 150 via controlling the power supply 144 that is electrically connected to the induction coils 320. Accordingly, the frequency and/or power amplitude (e.g., voltage and/or current) of the polyphase electrical power supplied by the power supply 144 may be controlled and/or adjusted (e.g., initiated, adjusted, and/or inhibited). Such control and/or adjustment of the frequency and/or power amplitude of polyphase electrical power applied to one or more sets of induction coils 320 of the EMP 120 changes the performance of the multistage ALIP in pumping (e.g., inducing flow of) liquid metal coolant 190 therethrough.

Still referring to FIGS. 4A-4D, in some example embodiments, at least one flow duct of the inner flow duct 310-1 or the outer flow duct 310-2 may include a gamma shielding material. The gamma shielding material may be configured to block gamma rays 460 (also referred to herein as simply gammas) emitted from the liquid metal coolant 190 flowing through the flow annulus 312 from entering the interior 380 of the EMP 120 that is at least partially defined by the pump casing 302 and which is external to the flow annulus 312 (e.g., the central interior space 382 at least partially defined by an inner surface 310-1$is$ of the inner flow duct 310-1 and/or the annular interior space 384 at least partially defined by an outer surface 310-2$os$ of the outer flow duct 310-2 and an inner surface 302$is$ of the pump casing 302). For example, the liquid metal coolant 190 that is drawn into the flow annulus 312 via an inlet 122 of the EMP 120 may be at a relatively high temperature, for example an inlet temperature of approximately 350° C., and may be strongly activated, for example a liquid sodium coolant including Na-24. Such a liquid metal coolant 190, being strongly activated and at a relatively high temperature, may emit gamma rays 460 from the liquid metal coolant 190. Such gamma rays 460 may have the potential to wear and/or damage (e.g., degrade and/or activate) internal components of the EMP 120, including any of the stators 322, induction coils 320, conductive circuits, insulation such as electrical insulation material 336, or the like. A gamma shielding material in at least one flow duct of the inner flow duct 310-1 or the outer flow duct 310-2 may block such gamma rays 460 in the flow annulus 312 from entering the interior 380 of the EMP 120 (e.g., the central interior space 382 at least partially defined by the inner surface 310-1$is$ of the inner flow duct 310-1 and/or the annular interior space 384 at least partially defined by the outer surface 310-2$os$ of the outer flow duct 310-2 and the inner surface 302$is$ of the pump casing 302) from the flow annulus 312.

As described herein, "blocking" gamma rays, also referred to herein as "attenuation" and/or "shielding" of gamma rays, by a gamma shielding material may include reducing, minimizing, or preventing penetration of incident gamma rays through the gamma shielding material so as to exit the gamma shielding material (e.g., to pass entirely through the gamma shielding material) and be incident on (e.g., contact) another material, element, space, or the like subsequently to exiting the gamma shielding material. As described herein, a gamma shielding material may "block" (e.g., "attenuate") gamma rays (also referred to herein as gamma radiation) based on various mechanisms. For example, a gamma shielding material may "block" (e.g., "attenuate") gamma rays (e.g., incident gamma rays that are incident on the gamma shielding material) at least partially based on photoelectric absorption of gamma rays by the gamma shielding material, including a complete transfer of energy from an incident gamma ray photon to an atomic electron of the gamma shielding material. In another example, a gamma shielding material may "block" (e.g., "attenuate") gamma rays (e.g., incident gamma rays that are incident on the gamma shielding material) at least partially based on scattering (e.g., Compton scattering) of gamma rays by the gamma shielding material, including a transfer of part of the energy of an incident gamma ray photon to an atomic electron of the gamma shielding material, such that the gamma ray photon may undergo further scattering or absorption interactions shielding material and/or emerge from the shielding material with diminished energy. In another example, a gamma shielding material may "block" (e.g., "attenuate") gamma rays (e.g., incident gamma rays that are incident on the gamma shielding material) at least partially based on pair production, including interaction of a relatively high-energy (e.g., at least 1022 keV) incident gamma ray photon with the nucleus of an atom of the gamma shielding material which results in the creation of beta particle and a positron that then undergoes an annihilation reaction with an electron to produce two lower-energy (e.g., 511 keV) gamma rays.

In example embodiments where at least one flow duct of the inner flow duct 310-1 or the outer flow duct 310-2 includes a gamma shielding material, the gamma shielding material may reduce, minimize, or prevent such gamma rays 460 from passing through the at least one flow duct to reach internal components of the EMP 120 to wear and/or damage such components. As described herein, a gamma shielding material, in any example embodiments (e.g., at least one of the gamma shielding materials 414, 424 as shown in FIG. 4B), may include one or more of Lead, Iron and Steel-Alloys, Tin, Bismuth, Tungsten and its Alloys, Water, or Borated Paraffin or Polyethylene. In some example embodiments, the at least one flow duct may include the gamma shielding material as a filler material within an annular duct space defined between concentric cylindrical duct walls. The concentric cylindrical duct walls may provide structural support for the at least one flow duct, and the gamma shielding material provided as a filler material (e.g., filler) therebetween may or may not provide structural integrity of the at least one flow duct. In some example embodiments, the at least one flow duct may comprise the gamma shielding material in a structure having a surface at least partially defining the flow annulus 312, such that at least some of the gamma shielding material may be directly exposed to the flow annulus 312. Restated, where at least one flow duct 310 includes a material at least partially defining an inner surface or an outer diameter surface of the flow annulus 312 (e.g., inner surface 310-2is or 310-1os, respectively), the material may include the gamma shielding material.

In some example embodiments, the at least one flow duct may comprise a single piece of material that includes the gamma shielding material alone or in combination with one or more additional materials (e.g., a mixture of at least one of the aforementioned gamma shielding materials and stainless steel).

In some example embodiments, at least one flow duct of the inner flow duct 310-1 or the outer flow duct 310-2 may include concentric cylindrical duct walls defining a duct annulus between the concentric cylindrical duct walls, and a gamma shielding material may located within the duct annulus, for example as a filler material in the duct annulus. For example, as shown in at least FIG. 4B, the inner flow duct 310-1 may include concentric cylindrical duct walls 410-1 and 410-2 collectively defining an inner duct annulus 412 between respective outer and inner surfaces 410-1os and 410-2is thereof, where the inner surface 410-1is of the inner cylindrical duct wall 410-1 defines the inner surface of the inner flow duct 310-1, and the outer surface 410-2os of the outer cylindrical duct wall 410-2 defines the outer surface 310-1os of the inner flow duct that at least partially defines the flow annulus 312 of the EMP 120. As shown, a gamma shielding material 414 may be located (e.g., may partially or entirely fill) the inner duct annulus 412, for example as a filler material partially or entirely filling the inner duct annulus 412. As shown, the gamma shielding material 414 may be one or more pieces of material and may have an outer surface 414os in contact with the inner surface 410-2is of the outer cylindrical duct wall 410-2, but example embodiments are not limited thereto. As shown, the gamma shielding material 414 may be one or more pieces of material and may have an inner surface 414is in contact with the outer surface 410-1os of the inner cylindrical duct wall 410-1, but example embodiments are not limited thereto. While the gamma shielding material 414 may be provided as a filler material within the inner duct annulus 412, example embodiments are not limited thereto. In some example embodiments, one or more of the cylindrical duct walls 410-1 or 410-2 may be omitted from the inner flow duct 310-1, and in some example embodiments the gamma shielding material 414 may contribute to structural support and/or integrity of at least the inner flow duct 310-1. In some example embodiments, the inner flow duct 310-1 may comprise a single piece of material that includes the gamma shielding material, alone or as a mixture of the gamma shielding material with one or more additional materials (e.g., stainless steel).

In another example, as shown in at least FIG. 4B, the outer flow duct 310-2 may include concentric cylindrical duct walls 420-1 and 420-2 collectively defining an outer duct annulus 422 between respective outer and inner surfaces 420-1os and 420-2is thereof, where the inner surface 420-1is of the inner cylindrical duct wall 420-1 defines the inner surface of the outer flow duct 310-2 that at least partially defines the flow annulus 312 of the EMP 120, and the outer surface 420-2os of the outer cylindrical duct wall 420-2 defines the outer surface 310-2os of the outer flow duct. As shown, a gamma shielding material 424 may be located (e.g., may partially or entirely fill) the outer duct annulus 422 and may be provided as a filler material partially or entirely filling the outer duct annulus 422. As shown, the gamma shielding material 424 may be one or more pieces of material and may have an outer surface 424os in contact with the inner surface 420-2is of the outer cylindrical duct wall 420-2, but example embodiments are not limited thereto. While the gamma shielding material 424 may be provided as a filler material within the outer duct annulus 422, example embodiments are not limited thereto. As shown, the gamma shielding material 424 may be one or more pieces of material and may have an inner surface 424is in contact with the outer surface 420-1os of the inner cylindrical duct wall 420-1, but example embodiments are not limited thereto. In some example embodiments, one or more of the cylindrical duct walls 420-1 or 420-2 may be omitted from the outer flow duct 310-2, and in some example embodiments the gamma shielding material 424 may contribute to structural support and/or integrity of at least the outer flow duct 310-2. In some example embodiments, the outer flow duct 310-2 may comprise a single piece of material that includes the gamma shielding material, alone or as a mixture of the gamma shielding material with one or more additional materials (e.g., stainless steel).

In some example embodiments, at least one flow duct of the inner flow duct 310-1 or the outer flow duct 310-2 may include a material at least partially defining an inner surface 310-1os or an outer surface 310-2is of the flow annulus 312, where the material includes the gamma shielding material. For example, in some example embodiments the outer cylindrical structure 410-2 and the gamma shielding material 414 may be replaced with a single cylindrical structure having an outer surface at least partially defining the outer surface 310-1os of the inner flow duct 310-1 and including the gamma shielding material alone or in combination with another material, and the inner cylindrical structure 410-1 may be present or absent from the inner flow duct 310-1. In another example, in some example embodiments the inner cylindrical structure 420-1 and the gamma shielding material 424 may be replaced with a single cylindrical structure having an inner surface at least partially defining the inner surface 310-2is of the outer flow duct 310-2 and including the gamma shielding material alone or in combination with another material, and the outer cylindrical structure 420-2 may be present or absent from the outer flow duct 310-2. As shown in at least FIG. 4B, each of the inner flow duct 310-1 and the outer flow duct 310-2 may include one or more gamma shielding materials. In some example embodiments, the inner flow duct 310-1 and the outer flow duct 310-2 may include a same or different gamma shielding materials. In some example embodiments, one of the inner flow duct 310-1 or the outer flow duct 310-2 does not include any gamma shielding material.

Based on the EMP 120 including a gamma shielding material (e.g., 414 and/or 424) in at least one flow duct of the inner flow duct 310-1 or the outer flow duct 310-2, the EMP 120 may be configured to reduce, minimize, or prevent wear and/or damage to the EMP 120 (e.g., internal components thereof including the stators 322, induction coils 320, electrical insulation material 336, or the like). As a result, the EMP 120 may be configured to reduce, minimize, or prevent expensive radiation testing, enable many flexible reactor designs since the EMP can be located anywhere in the reactor vessel, and enhance heat transfer between pump components and liquid metal coolant 190 (e.g., via thermally conductive electrical insulation material 336) to enable self-cooling of the EMP. Additionally, the EMP having the gamma shielding material according to some example embodiments may be configured to be easily and quickly implemented without requiring component program development or significant research efforts. Additionally, based on including gamma shielding material 414 and/or 424 in at least one flow duct in the EMP 120, the EMP 120 may be configured to reduce, minimize, or prevent pump material degradation (e.g., wear) and/or damage due to radiation at elevated temperatures within an interior of the nuclear reactor pressure vessel 111.

While example embodiments shown in at least FIG. 4B illustrate gamma shielding material being included in at least one flow duct 310 (also referred to herein as at least one duct) of the inner flow duct 310-1 or the outer flow duct 310-2, example embodiments are not limited thereto, and in some example embodiments a gamma shielding material may be included in any of the components of the EMP 120 (e.g., included in the pump casing 302, for example as a filler and/or as part of an alloy material at least partially comprising the pump casing 302).

Still referring to FIGS. 3A-4D, in some example embodiments, the pump casing 302 may include a neutron absorber material. The neutron absorber material may be configured to absorb neutrons (e.g., ambient neutrons 470) entering the pump casing 302 from an exterior of the EMP 120 (e.g., an ambient environment 450 that is external to the EMP 120), thereby reducing, minimizing, ore preventing wear and/or damage to the EMP 120 and/or any internal components thereof due to receiving ambient neutrons 470 from an ambient environment 450 that is at a relatively high temperature and high radiation environment within the nuclear reactor pressure vessel 111. A neutron absorber material, in any example embodiments, may include one or more of Gadolinium, Cadmium, Boron, Boron Carbide, Gadolinium oxide, Hafnium Lithium, Tantalum, Europium, Gadolinium Stainless Steel, Hafnium, Silver, Xenon, or Indium. The neutron absorber material may be provided as a filler material within (e.g., partially or entirely filling) an annulus at least partially defined between concentric cylindrical casing walls, but example embodiments are not limited thereto. In some example embodiments, the neutron absorber material may partially or entirely comprise one or more structures of the pump casing 302 (e.g., the outer sidewall structure 302-1, end structures 302-2, and/or inner sidewall structure 302-3), for example such that the pump casing 302 (e.g., the outer sidewall structure 302-1) includes a material at least partially defining an outer surface 302os of the pump casing 302 and thus an outer surface of the EMP 120 where the material includes the neutron absorber material, but example embodiments are not limited thereto. In some example embodiments, the neutron absorber material may be provided as an outer layer of material (e.g., a cylindrical jacket of neutron absorber material) on an outer surface 302os of the pump casing 302, but example embodiments are not limited thereto.

In FIG. 4C, a view of an outer sidewall structure 302-1 that includes neutron absorber material 434 is shown, but it will be understood that the view provided in FIG. 4C and the structures of the outer sidewall structure 302-1 shown therein may be included in any portion of the pump casing 302, including any portion of the end structure 302-2 and/or inner sidewall structures 302-3.

Referring to FIGS. 4A and 4C, in some example embodiments, at least a part of the pump casing 302 (e.g., the outer sidewall structure 302-1 as shown in FIG. 4C) may include concentric cylindrical casing walls defining a casing annulus between the concentric cylindrical casing walls, and the neutron absorber material may be located within the casing annulus, for example as a filler material partially or entirely filling the casing annulus, although example embodiments are not limited thereto. For example, as shown in at least FIG. 4C, at least the outer sidewall structure 302-1 of the pump casing 302 may include concentric cylindrical casing walls 430-1 and 430-2 collectively defining a casing annulus 432 between respective outer and inner surfaces 430-1os and 430-2is thereof, where the inner surface 430-1is of the inner cylindrical casing wall 430-1 defines the inner surface 302is of the portion of the pump casing 302 (e.g., an inner surface of the outer sidewall structure 302-1), and the outer surface 430-2os of the outer cylindrical casing wall 430-2 defines the outer surface 302os of the portion of the pump casing 302 and thus may at least partially define an outer surface of the EMP 120 that is directly exposed to the ambient environment 450 surrounding the EMP 120.

As shown, a neutron absorber material 434 may be located (e.g., may partially or entirely fill, as a filler material) the casing annulus 432. As shown, the neutron absorber material 434 may be one or more pieces of material and may have an outer surface 434os in contact with the inner surface 430-2is of the outer cylindrical casing wall 430-2, but example embodiments are not limited thereto. As shown, the neutron absorber material 434 may be one or more pieces of material and may have an inner surface 434is in contact with the outer surface 430-1os of the inner cylindrical casing wall 430-1, but example embodiments are not limited thereto. In some example embodiments, one or more of the cylindrical casing walls 430-1 or 430-2 may be omitted from the portion of the pump casing 302, such that the portion of the pump casing 302 (e.g., the outer sidewall structure 302-1 as shown) may be at least partially defined by and/or comprised of the neutron absorber material 434. In some example embodiments, the portion of the pump casing 302 (e.g., the outer sidewall structure 302-1 as shown) may comprise a single piece of material that includes the neutron absorber material, alone or as a mixture of the neutron absorber material with one or more additional materials (e.g., stainless steel).

The neutron absorber material 434 may be configured to absorb ambient neutrons 470 entering the EMP 120 from an exterior of the EMP 120, for example an ambient environment 450 at least partially surrounding the EMP 120. The ambient environment 450 may be a relatively high-temperature (e.g., at least 350C), high radiation environment, such that the ambient neutrons 470 may be relatively high-energy neutrons which may wear and/or damage (e.g., degrade and/or activate) internal components of the EMP 120 that the ambient neutrons 470 contact. The neutron absorber material 434 may absorb at least some or all of such ambient neutrons 470 to reduce, minimize, or prevent such ambient neutrons 470 from penetrating further into an interior 380 of the EMP 120 to contact internal components thereof. Accordingly, an EMP 120 may be configured to reduce, minimize, or prevent neutron exposure of internal EMP components to the ambient neutrons 470 of the ambient environment 450, thereby improving the service life, performance, maintenance schedule, and/or decommissioning process for the EMP 120.

Based on the EMP 120 including the neutron absorber material 434 therein, the EMP 120 may be configured to be easily and quickly implemented without requiring component program development or significant research efforts. Based on including the neutron absorber material 434, the EMP 120 may be configured to reduce, minimize, or prevent pump material degradation (e.g., wear) and/or damage due to neutron exposure to EM pump components from a high-temperature, high-radiation ambient environment 450. An EMP 120 including the neutron absorber material 434 according to any of the example embodiments may have an extended lifetime while being located in the nuclear reactor pressure vessel 111, may enable improved flexibility in reactor design since the EMP can be located closer to the reactor core, thus decreasing the cost of reactor vessel system, may enable reduction, minimization, or elimination of expensive irradiation testing to qualify insulation lifetime under temperature, voltage, and radiation conditions within an interior of a nuclear reactor, may reduce, minimize, or prevent neutron exposure to EM pump components at high temperatures to thereby would improve EMP reliability, may be implemented in various configurations of EMPs, including self-cooling EMPs, without limitation from design, size, or performance requirements, may maintain compatibility with other pump components and reactor structural materials in terms of thermophysical and neutronic properties, and may reduce, minimize, or prevent activation in pump components, which would considerably allow quick maintenance and less complicated pump decommissioning procedures.

While example embodiments shown in at least FIG. 4C illustrate neutron absorber material being included in at least a portion of the pump casing 302 (e.g., the outer sidewall structure 302-1), example embodiments are not limited thereto, and in some example embodiments a neutron absorber material may be included in any of the components of the EMP 120 (e.g., included in at least one flow duct 310, for example as a filler and/or as part of an alloy material at least partially comprising the at least one flow duct).

Still referring to FIGS. 4A, 4C, and 4D, in some example embodiments, the EMP 120 may include a neutron moderator material 452 on an outer surface 302os of the pump casing 302. The neutron moderator material 452 may at least partially surround, enclose, or the like some or all of the EMP 120, for example the neutron moderator material 452 may cover exposed outer surfaces 302os of the pump casing 302, with openings in the neutron moderator material 452 to enable power cable 146 to enter the EMP 120 and openings for the inlet 122 and the outlet 123 of the EMP 120. The neutron moderator material 452 may be provided as a jacket surrounding the outer surface 302os of the pump casing 302 and may be located as a filler material within a jacket of concentric cylindrical jacket walls (e.g., comprising stainless steel) defining a jacket annulus therebetween that may be at least partially filled by the neutron moderator material, although example embodiments are not limited thereto and in some example embodiments the neutron moderator material 452 may be provided as a single-material jacket at least partially surrounding the pump casing 302. A neutron moderator material, in any example embodiments, may include one or more of Graphite, Heavy water, Light water, Paraffin, polyethylene, concrete, or Beryllium.

In some example embodiments, the neutron moderator material 452 may be configured be located between the neutron absorber material 434 and the ambient environment 450 and thus may be configured to slow down (e.g., moderate) ambient neutrons 470-1 received from the ambient environment 450 that is external to the EMP 120 such that the neutrons entering the pump casing 302 from the exterior of the EMP 120 (e.g., ambient environment 450) are moderated neutrons 470-2, and the neutron absorber material 434 included in the pump casing 302 (e.g., neutron absorber material 434 as shown in FIG. 4C) may be configured to absorb the moderated neutrons 470-2. Based on including a neutron moderator material 452 that is configured to moderate ambient neutrons 470-1 prior to the ambient neutrons reaching the neutron absorber material 434, the probability of absorption of the ambient neutrons by the neutron absorber material 434 may be improved, thereby further reducing, minimizing, or preventing neutron exposure by internal components of the EMP 120 (e.g., stators 322, induction coils 320, etc.).

Figure 5:
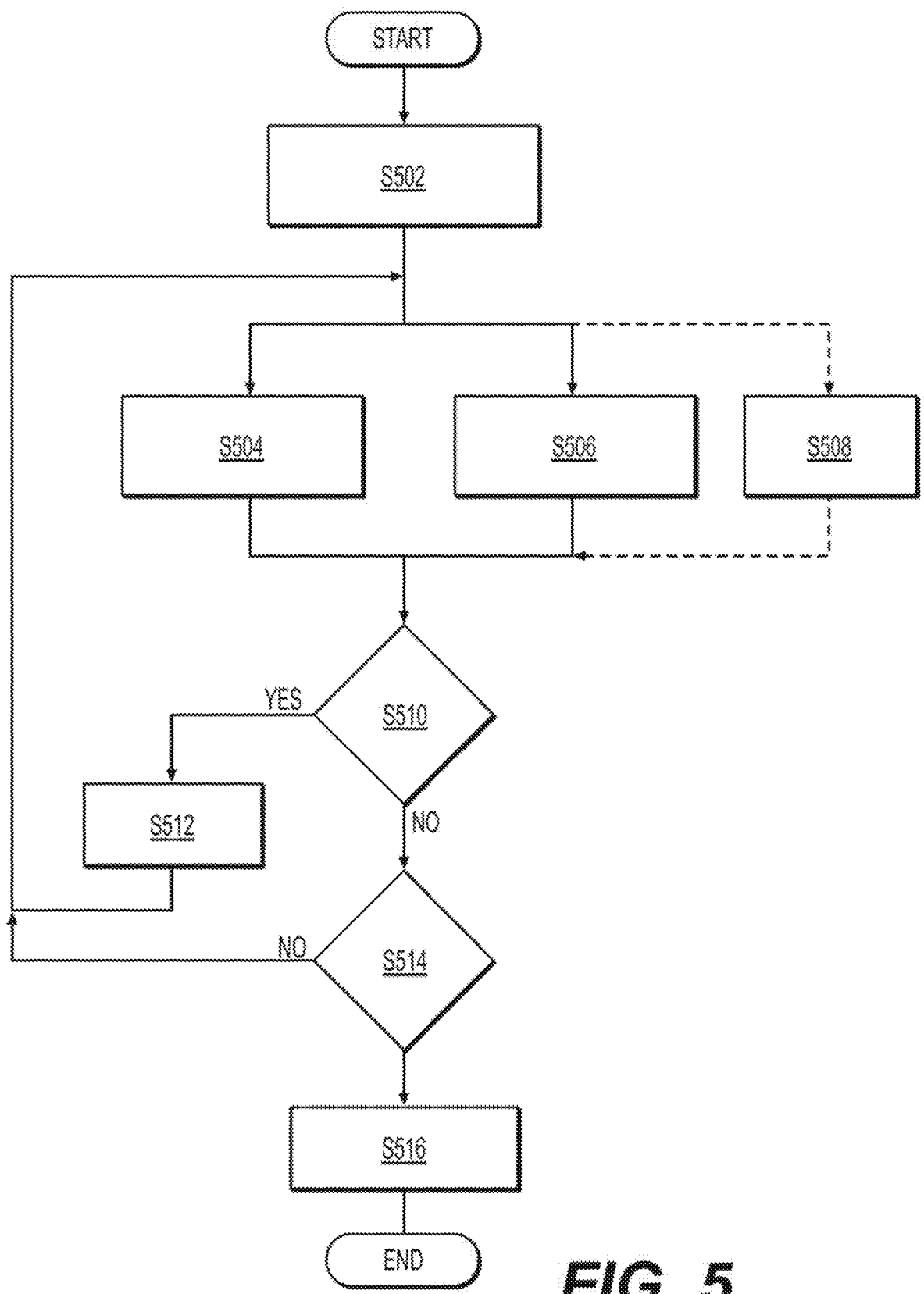
FIG. 5 is a flowchart illustrating a method for operating an EMP, according to some example embodiments.

FIG. 5 is a flowchart illustrating a method for operating an EMP, according to some example embodiments. The method shown in FIG. 5 may be implemented with regard to any EMP according to any of the example embodiments. The method shown in FIG. 5 may be at least partially implemented by an EMP control system 150 such as the EMP control system 150 shown in FIG. 1 and with regard to one or more power supplies such as the power supply 144 shown in FIG. 1.

As shown in FIG. 5, the method may include, at S502, initiating the supply of electric power (e.g., polyphase electric power) supplied to the EMP 120 (e.g., to the plurality of induction coils 320 thereof) from the power supply 144 (e.g., a polyphase power supply). As a result, at S504, the EMP 120 (e.g., the plurality of induction coils 320) operate to cause liquid metal coolant 190 to flow through the flow annulus 312, for example based on induction coils 320 generating one or more magnetic fields based on the received electrical power which causes the liquid metal coolant 190 to flow through the flow annulus 312. Operation S502 may include determining whether to initiate (e.g., turn on) a supply of polyphase electrical power the power supply 144. If so, at S502, a control signal may be generated and transmitted to the power supply 144 to cause the power supply 144 to initiate the supply of polyphase electrical power to the EMP 120. The control signal may be generated and transmitted by the EMP control system 150. The control signal may cause the power supply 144 to initiate a supply of polyphase electrical power having a particular (e.g., predetermined) frequency, power amplitude (e.g., voltage and/or current), phases, or the like.

At S506, at least partially concurrently with the EMP 120 (e.g., the plurality of induction coils 320) operating to cause liquid metal coolant 190 to flow through the flow annulus 312, a gamma shielding material included in at least one of an inner flow duct 310-1 or an outer flow duct 310-2 of the EMP 120 may reduce, minimize, or prevent gamma ray 460 penetration from the liquid metal coolant 190 that is in the flow annulus 312 to an interior 380 of the EMP 120 that is external to the flow annulus 312 (e.g., to the induction coils 320, any stators included in the EMP 120, any circuitry included in the EMP 120, any conductive elements included in the EMP 120, or the like). As a result, the gamma shielding material may reduce, minimize, or prevent any wear and/or damage of the EMP 120 and/or any portions thereof due to gamma rays 460 emitted from the liquid metal coolant 190 flowing through the flow annulus 312. Thus, the gamma shielding material in at least one of the inner flow duct 310-1 or the outer flow duct 310-2 may provide improved performance and/or reliability of the EMP 120, extended service life of the EMP 120, and reduced frequency of repair, maintenance, and/or replacement of the EMP 120 that might otherwise occur due to the EMP incurring wear and/or damage due to gamma rays 460 emitted from the liquid metal coolant 190 flowing through the flow annulus 312. It will be understood that the gamma shielding material included in at least one of an inner flow duct 310-1 or an outer flow duct 310-2 of the EMP 120 reducing, minimizing, or preventing gamma ray 460 penetration from the liquid metal coolant 190 that is in the flow annulus 312 may occur while no flow of the liquid metal coolant 190 is occurring in the flow annulus 312, such that liquid metal coolant 190 is present in the flow annulus 312 and has no or substantially no flow rate (e.g., mass and/or volumetric flow rate) through the flow annulus 312.

At S508, at least partially concurrently with the EMP 120 (e.g., the plurality of induction coils 320) operating to cause liquid metal coolant 190 to flow through the flow annulus 312, a neutron absorber material included in the pump casing 302 of the EMP 120 may absorb neutrons (e.g., ambient neutrons 470) received at the pump casing 302 (e.g., the outer sidewall structure 302-1) from an exterior of the EMP 120 (e.g., an ambient environment 450 of an interior of the nuclear reactor 110 in which the EMP 120 is located). As a result, the neutron absorber material may reduce, minimize, or prevent any wear and/or damage of the EMP 120 and/or any portions thereof due to neutrons (e.g., ambient neutrons) entering the EMP 120 (e.g., at least the pump casing 302) from an external environment (e.g., liquid metal coolant 190 and/or structures of the nuclear reactor 110 surrounding the EMP 120 within the nuclear reactor 110) emitted from the liquid metal coolant 190 flowing through the flow annulus 312. Thus, the neutron absorber material in the pump casing 302 of the EMP 120 may provide improved performance and/or reliability of the EMP 120, extended service life of the EMP 120, and reduced frequency of repair, maintenance, and/or replacement of the EMP 120 that might otherwise occur due to the EMP 120 incurring wear and/or damage due to ambient neutrons 470 received at the EMP 120 and/or entering the EMP 120 from an exterior of the EMP 120 (e.g., an ambient environment 450). It will be understood that the neutron absorber material may be absent from the EMP 120 in some example embodiments. It will be understood that the neutron absorber material may absorb ambient neutrons 470 in the absence of any flow of the liquid metal coolant 190 through the flow annulus 312.

In some example embodiments, the EMP 120 may include a neutron moderator material 452 on an outer surface 302os of the pump casing 302, and at S508 the neutron moderator material may moderate one or more ambient neutrons 470-1 received at the neutron moderator material 452 from the exterior of the EMP 120 to establish moderated neutrons 470-2 which may then enter at least the pump casing 302 of the EMP 120 and be absorbed by the neutron absorber material therein. As a result, the EMP 120 may be configured to sufficiently moderate ambient neutrons to improve the likelihood of absorbance thereof by the neutron absorber material in the pump casing 302, thereby further improving performance and reliability of the EMP 120 due to reduced, minimized, or prevented entry of the ambient neutrons into the interior 380 of the EMP 120 to potentially wear and/or damage any portions of the EMP 120.

At S510, a determination may be made whether to adjust a supply of electric power from the power supply 144 to the EMP 120 (e.g., adjust the magnitude of voltage, current, or the like of electric power supplied to the EMP 120 to adjust the flow rate of the flow of liquid metal coolant 190 through the flow annulus 312 that is induced by the EMP 120. If so, at S512 the adjustment is implemented. If not, at S514, a determination may be made whether to terminate or inhibit the supply of electric power electric power from the power supply 144 to the EMP 120. If so, at S516 the supply is terminated or inhibited, thereby slowing or stopping the flow of liquid metal coolant 190 through the flow annulus 312 of the EMP due to the inhibition of driving force applied to the liquid metal coolant 190 in the flow annulus 312 by the EMP 120.

Operation S510 may include determining whether to adjust a frequency of the polyphase electrical power supplied by power supply 144 to the EMP 120. If so, at S512, a control signal may be generated and transmitted to the power supply 144 to cause the power supply 144 to adjust a frequency of the supply of polyphase electrical power that is being supplied to the EMP 120. The control signal may be generated and transmitted by the EMP control system 150. The control signal may cause the power supply 144 to adjust the frequency of the supply of polyphase electrical power to a new particular frequency.

Operation S510 may include determining whether to adjust a power amplitude (e.g., voltage and/or current) of the polyphase electrical power supplied by the power supply 144 to the EMP 120. If so, at S512, a control signal may be generated and transmitted to the power supply 144 to cause the power supply 144 to adjust a power amplitude (e.g., voltage and/or current] of the supply of polyphase electrical power that is being supplied to the EMP 120. The control signal may be generated and transmitted by the EMP control system 150. The control signal may cause the power supply 144 to adjust the power amplitude (e.g., voltage and/or current) of the supply of polyphase electrical power to a new particular power amplitude (e.g., voltage and/or current).

Operation S514 may include determining whether to inhibit (e.g., turn off) a supply of polyphase electrical power from the power supply 144 to the EMP 120. If so, at S516, a control signal may be generated and transmitted to the power supply 144 to cause the power supply 144 to inhibit the supply of polyphase electrical power to the EMP 120. The control signal may be generated and transmitted by the EMP control system 150. The control signal may cause the power supply 144 to inhibit a supply of polyphase electrical power to the EMP 120.

It will be understood that any of the operations of the method shown in FIG. 5 may be performed in any order, including being performed simultaneously. It will be understood that, in some example embodiments, any of the operations of the method shown in FIG. 5 may be performed independently of each other. In some example embodiments, any of the operations shown in FIG. 5 may be omitted and/or one or more additional operations may be added to the method shown in FIG. 5. In some example embodiments, each of the determinations and/or operations as shown in FIG. 5 may be performed in response to receiving an input command via a user interface (e.g., keyboard, button, touchscreen, mouse, etc.) and/or communication interface (e.g., wireless network communication receiver) and/or in response to processing sensor data received from one or more sensor devices (e.g., one or more flowmeters such as one or more Venturi flow meters in the suction line 121 and/or the return line 124 that may be configured to generate sensor data indicating a flow rate of liquid metal coolant 190 through the suction line 121, return line 124, and/or EMP 120, one or more pressure sensors that may be configured to generate sensor data indicating a pressure of liquid metal coolant 190 at one or more locations in the suction line 121, return line 124, and/or EMP 120, or the like).

In some example embodiments, an adjustment of frequency and/or power amplitude of polyphase electrical power that is supplied to the EMP 120 may include determining a particular frequency and/or power amplitude and controlling a polyphase electrical power supply (e.g., power supply 144) to cause the polyphase electrical power supply to supply polyphase electrical power having the particular frequency and/or power amplitude to the EMP 120. The determining the particular frequency and/or power amplitude may be in response to receiving an input command that specifies a particular frequency and/or power amplitude of polyphase electrical power to be supplied to the EMP 120 and/or in response to processing sensor data received from one or more sensor devices (e.g., one or more flowmeters such as one or more Venturi flow meters that may be configured to generate sensor data indicating a flow rate of liquid metal coolant 190 through the suction line 121, return line 124, and/or EMP 120, one or more pressure sensors that may be configured to generate sensor data indicating a pressure of liquid metal coolant 190 at one or more locations in the suction line 121, return line 124, and/or EMP 120, or the like).

The input command and/or sensor data may be processed to determine a desired or target flow rate and/or pressure rise distribution of liquid metal coolant through at least the EMP 120, an actual flow rate and/or pressure rise distribution of liquid metal coolant through at least the EMP 120 and/or primary coolant loop 119, or the like. In some example embodiments, where an actual flow rate and/or pressure rise distribution is determined based on processing sensor data, a target flow rate and/or pressure rise distribution may be determined based on comparing the actual flow rate and/or pressure rise distribution with a desired, threshold, or target flow rate and/or pressure rise distribution that may be stored in a memory and/or database. The comparing may include determining a new target flow rate and/or pressure rise distribution based on a determination that the actual flow rate and/or pressure rise distribution exceeds one or more threshold flow rates and/or pressure rise distributions.

The determining the particular frequency and/or power amplitude may include, for example in response to an input command and/or processing of received sensor data (e.g., in response to determining a desired, target, and/or actual flow rate and/or pressure rise distribution of liquid metal coolant through at least the EMP 120 and/or primary coolant loop 119, or the like), accessing an empirically-generated look-up table that associates an actual, target, and/or desired liquid metal coolant 190 flow rate and/or pressure rise distribution in the EMP 120 with specific parameters (e.g., frequency and/or power amplitude, initiated or inhibited state, etc.) of polyphase electrical power to be supplied to the EMP to implement the associated liquid metal coolant 190 flow rate and/or pressure rise distribution. In some In some example embodiments, the look-up table may be accessed in response to receiving an input of a desired, target, and/or actual liquid metal coolant 190 flow rate and/or pressure rise distribution in the EMP 120 in order to identify specific parameters (e.g., frequency and/or power amplitude, initiated or inhibited state, etc.) of polyphase electrical power to be supplied by the polyphase power supply to an EMP to implement the desired and/or target liquid metal coolant flow rate and/or pressure rise distribution. The operations S504, S512, and/or S516 may include transmitting control signals to a polyphase power supply to cause the polyphase power supply to adjust the polyphase electrical power supplied thereby to the EMP 120 pursuant to the specific parameters (e.g., frequency and/or power amplitude, initiated or inhibited state, etc.) of polyphase electrical power to be supplied by a polyphase power supply to a corresponding EMP to implement the desired and/or target liquid metal flow rate and/or pressure rise distribution.

Figure 6:
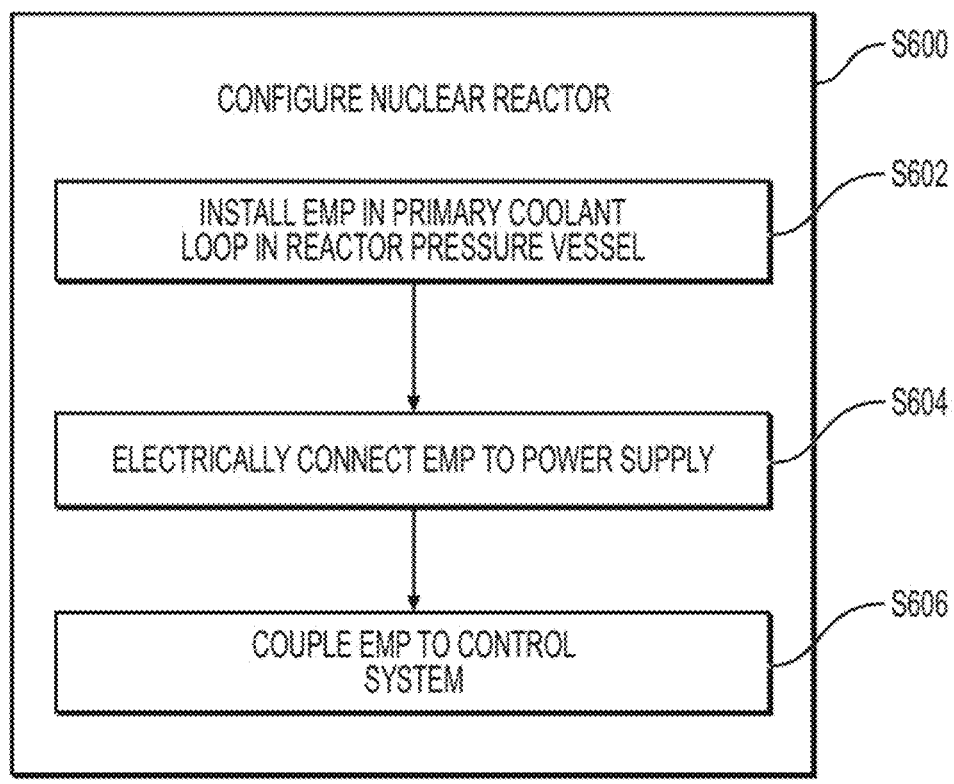
FIG. 6 is a flowchart illustrating a method for configuring a nuclear reactor to improve reliability and protection of liquid metal coolant flow control in the nuclear reactor, according to some example embodiments.

FIG. 6 is a flowchart illustrating a method for configuring S600 a nuclear reactor to improve performance and reliability of liquid metal coolant flow circulation and/or control in the nuclear reactor, according to some example embodiments. The configuring may be implemented with regard to any example embodiment of nuclear reactors included herein, including the nuclear reactor 110 illustrated in FIG. 1.

At S602, the configuring S600 may include installing an EMP 120 in a primary coolant loop 119 within the nuclear reactor pressure vessel 111. The EMP 120 may be any of the EMPs 120 according to any of the example embodiments. The installing may be implemented by a human operator. Such installing may include connecting the inlet 122 of the EMP 120 to a suction line 121 of the primary coolant loop 119 and connecting the outlet 123 of the EMP 120 to a return line 124 of the primary coolant loop 119. The installing may include connecting the pump casing 302 of the EMP 120 to a structural support member of the nuclear reactor 110, to structurally connect the EMP 120 to the nuclear reactor pressure vessel 111, the core inlet plenum 118, the nuclear reactor core 112, the primary heat exchanger 114, the suction reservoir 116, or any combination thereof.

At S604, the configuring S600 may include electrically coupling the EMP 120 to a power supply 144 (e.g., a polyphase power supply configured to supply polyphase electrical power), thereby electrically connecting the EMP 120 to the power supply 144. The coupling may be implemented by a human operator. The electric coupling at S604 may include electrically connecting the plurality of induction coils 320 of the EMP 120 to a power cable 146 where the power cable 146 extends through a power supply conductor 180, or extension cord from the EMP 120 to at least an exterior of the nuclear reactor pressure vessel 111 via an opening 182 (e.g., penetration) through the outer wall 111S of the nuclear reactor pressure vessel 111. The power cable 146 may be configured to connect the power supply 144 to the EMP 120.

At S606, the configuring S600 may include coupling (e.g., electrically coupling and/or communicatively coupling) the EMP 120 to one or more EMP control systems (also referred to herein as one or more control systems). The coupling may be implemented by a human operator. The coupling may include communicatively coupling the EMP 120 to one or more portions of the EMP control system 150 via one or more communication lines, electrically coupling the power supply 144 to the EMP control system 150, thereby indirectly communicatively coupling the EMP control system 150 to EMP 120 via the power supply 144 via one or more communication lines, power lines, etc. The EMP control system 150 may include a memory (e.g., a solid state drive or SSD) storing a program of instructions and a processor (e.g. a central processor unit or CPU) configured to execute the program of instructions to independently control the EMP 120, and thus to control a flow of liquid metal coolant through at least the flow annulus of the EMP 120, and thus through the primary coolant loop 119, based on controlling electrical power (e.g., polyphase electrical power) supplied by the power supply 144.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

The invention claimed is:

1. An electromagnetic pump (EMP), comprising:
a pump casing having a longitudinal axis extending in a longitudinal direction, the pump casing at least partially defining an interior of the EMP;
concentric inner and outer flow ducts extending coaxially with the longitudinal axis and collectively defining a flow annulus extending coaxially with the longitudinal axis; and
a plurality of induction coils within the interior of the EMP and configured to be electrically connected to a power supply, the plurality of induction coils configured to control a flow of liquid metal coolant through the flow annulus based on electrical power received from the power supply,
wherein at least the outer flow duct includes a gamma shielding material that is configured to block gamma rays emitted from the liquid metal coolant flowing through the flow annulus from entering the interior of the EMP from the flow annulus,
wherein
the outer flow duct includes first concentric cylindrical duct walls defining a first duct annulus between the first concentric cylindrical duct walls, the first concentric cylindrical duct walls including a first outer cylindrical duct wall and a first inner cylindrical duct wall, the first concentric cylindrical duct walls defining the first duct annulus between an inner surface of the first outer cylindrical duct wall and an outer surface of the first inner cylindrical duct wall, an inner surface of the first inner cylindrical duct wall partially defining the flow annulus,
the gamma shielding material is in the first duct annulus between the first outer cylindrical duct wall and the first inner cylindrical duct wall, such that the first inner cylindrical duct wall is between the gamma shielding material and the flow annulus, and
the gamma shielding material is a filler material in the first duct annulus.

2. The EMP of claim 1, wherein the pump casing includes a neutron absorber material, the neutron absorber material configured to absorb neutrons entering the pump casing from an exterior of the EMP.

3. The EMP of claim 2, wherein
the pump casing includes concentric cylindrical housing walls defining a housing annulus between the concentric cylindrical housing walls, and
the neutron absorber material is located within the housing annulus.

4. The EMP of claim 2, wherein the EMP further includes a neutron moderator material on an outer surface of the pump casing, the neutron moderator material configured to moderate neutrons received from the exterior of the EMP such that the neutrons entering the pump casing from the exterior of the EMP are moderated neutrons, the neutron absorber material configured to absorb the moderated neutrons.

5. The EMP of claim 1, wherein the plurality of induction coils includes at least one of
inner induction coils located within a central region at least partially defined by an inner surface of the inner flow duct, or
outer induction coils located within an annular region at least partially defined between an outer surface of the outer flow duct and an inner surface of the pump casing.

6. A method for operating the EMP of claim 1, the method comprising:
controlling a supply of electrical power to the EMP to cause the plurality of induction coils to generate one or more magnetic fields to induce a flow of liquid metal coolant through the flow annulus; and
blocking, at the gamma shielding material included in the outer flow duct, gamma rays emitted from liquid metal coolant located in the flow annulus from entering an interior of the EMP that is external to the flow annulus.

7. The method of claim 6, wherein,
the pump casing includes a neutron absorber material, the neutron absorber material configured to absorb neutrons entering the pump casing from an exterior of the EMP, and the method further includes absorbing, at the neutron absorber material, neutrons received at the pump casing from the exterior of the EMP.

8. A method for configuring a nuclear reactor to improve liquid metal coolant flow control in the nuclear reactor, the method comprising:
installing the EMP of claim 1 in a primary coolant loop in a nuclear reactor pressure vessel of the nuclear reactor;
electrically connecting the EMP to the power supply via a power cable; and
communicatively coupling the EMP to a control system, the control system including a memory storing a program of instructions and a processor configured to execute the program of instructions to control a flow of liquid metal coolant through the primary coolant loop based on controlling the supply of electrical power supplied from the power supply to the EMP.

9. A nuclear reactor configured to be cooled via liquid metal circulation, the nuclear reactor comprising:
a reactor pressure vessel;
a reactor core within the reactor pressure vessel; and
the EMP of claim 1 within the reactor pressure vessel, the EMP configured to circulate a flow of liquid metal coolant through a primary coolant loop that includes the reactor core.

10. The nuclear reactor of claim 9, further comprising:
a control system configured to control the power supply to control a supply of electrical power to the EMP, to control the flow of liquid metal coolant through the primary coolant loop.

11. The EMP of claim 1, wherein the gamma shielding material is configured to block an incident gamma ray photon emitted from the liquid metal coolant flowing through the flow annulus based on at least one of
photoelectric absorption of gamma rays by the gamma shielding material, including a complete transfer of energy from the incident gamma ray photon to an atomic electron of the gamma shielding material,
scattering of gamma rays by the gamma shielding material, the scattering including a transfer of part of energy of the incident gamma ray photon to an atomic electron of the gamma shielding material, such that the gamma shielding material causes the incident gamma ray photon to perform at least one of
further scattering or absorption interactions with the gamma shielding material, or
emerge from the gamma shielding material with diminished energy; or pair production, the pair production including interaction of the incident gamma ray photon with a nucleus of an atom of the gamma shielding material which results in creation of a beta particle and a positron that then undergoes an annihilation reaction with an electron to produce two lower-energy gamma rays.

12. The EMP of claim 1, wherein the gamma shielding material includes one or more of Lead, Tin, Bismuth, Tungsten, Water, Borated Paraffin, or Borated Polyethylene.

13. The EMP of claim 2, wherein the neutron absorber material includes one or more of Gadolinium, Cadmium, Gadolinium oxide, Hafnium Lithium, Europium, Gadolinium Stainless Steel, Silver, Xenon, or Indium.

14. The EMP of claim 1, wherein the inner flow duct and the outer flow duct each include at least one gamma shielding material that is configured to block gamma rays emitted from the liquid metal coolant flowing through the flow annulus from entering the interior of the EMP from the flow annulus.

15. The EMP of claim 1, wherein
the inner flow duct includes second concentric cylindrical duct walls defining a second duct annulus between second first concentric cylindrical duct walls, the second concentric cylindrical duct walls including a second outer cylindrical duct wall and a second inner cylindrical duct wall, the second concentric cylindrical duct walls defining the second duct annulus between an inner surface of the second outer cylindrical duct wall and an outer surface of the second inner cylindrical duct wall,
the outer flow duct and the inner flow duct collectively define the flow annulus between the inner surface of the first inner cylindrical duct wall of the outer flow duct and an outer surface of the second outer cylindrical duct wall of the inner flow duct,
an additional gamma shielding material is in the second duct annulus between the second outer cylindrical duct wall and the second inner cylindrical duct wall, such that the second outer cylindrical duct wall is between the additional gamma shielding material and the flow annulus,
the additional gamma shield material in the second duct annulus and the gamma shielding material in the first duct annulus are a same gamma shielding material, and
the additional gamma shielding material is a filler material in the second duct annulus.

16. The EMP of claim 1, wherein the gamma shielding material includes one or more of Water, Borated Paraffin, or Borated Polyethylene.

17. The EMP of claim 15, wherein the gamma shielding material and the additional gamma shielding material are each a same one or more of Water, Borated Paraffin, or Borated Polyethylene.

18. The EMP of claim 3, wherein the neutron absorber material is a filler material within the housing annulus.

19. The EMP of claim 1, wherein the gamma shielding material does not provide structural integrity of the outer flow duct.

20. The EMP of claim 15, wherein the additional gamma shielding material does not provide structural integrity of the inner flow duct.

* * * * *